United States Patent
Jang et al.

(10) Patent No.: US 10,606,264 B2
(45) Date of Patent: Mar. 31, 2020

(54) CONTROL METHOD AND CONTROL DEVICE OF AUTOMATIC DRIVING VEHICLE

(71) Applicant: Nissan Motor Co., Ltd., Yokohama-shi, Kanagawa (JP)

(72) Inventors: Hwaseon Jang, Kanagawa (JP); Takashi Sunda, Kanagawa (JP); Machiko Hiramatsu, Kanagawa (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 0 days.

(21) Appl. No.: 16/323,744

(22) PCT Filed: Aug. 8, 2016

(86) PCT No.: PCT/JP2016/073327
§ 371 (c)(1),
(2) Date: Feb. 6, 2019

(87) PCT Pub. No.: WO2018/029758
PCT Pub. Date: Feb. 15, 2018

(65) Prior Publication Data
US 2019/0171204 A1    Jun. 6, 2019

(51) Int. Cl.
*G05D 1/00* (2006.01)
*B60W 30/18* (2012.01)
(Continued)

(52) U.S. Cl.
CPC .......... *G05D 1/0061* (2013.01); *B60W 10/04* (2013.01); *B60W 10/184* (2013.01);
(Continued)

(58) Field of Classification Search
CPC .............. G05D 1/0061; G05D 1/0088; G05D 2201/0213; G05D 1/021; B60K 2310/244;
(Continued)

(56) References Cited

U.S. PATENT DOCUMENTS

| 5,197,563 A | 3/1993 | Sakonju et al. |
| 7,894,951 B2 | 2/2011 | Norris et al. |

(Continued)

FOREIGN PATENT DOCUMENTS

| EP | 2813408 A1 | 12/2014 |
| JP | H03-282713 A | 12/1991 |

(Continued)

*Primary Examiner* — Anne Marie Antonucci
(74) *Attorney, Agent, or Firm* — Young Basile Hanlon & MacFarlane, P.C.

(57) ABSTRACT

Provided is a control method of an automatic driving vehicle switchable between manual driving in which the vehicle is made to travel depending on an operation of an occupant and automatic driving in which driving characteristics in automatic travel are set and the vehicle is made to automatically travel based on the driving characteristics. Manual driving characteristics in the manual driving by the occupant are learned and, when switching from the manual driving to the automatic driving is performed, the automatic driving is performed with the manual driving characteristics maintained for a preset manual characteristic maintaining time. As a result, uneasiness of the occupant can be suppressed.

21 Claims, 21 Drawing Sheets

(51) Int. Cl.
*B60W 30/182* (2020.01)
*B60W 30/17* (2020.01)
*B60W 30/14* (2006.01)
*B60W 10/184* (2012.01)
*B60W 30/16* (2020.01)
*B60W 10/04* (2006.01)
*B60W 50/00* (2006.01)

(52) U.S. Cl.
CPC .......... *B60W 30/14* (2013.01); *B60W 30/143* (2013.01); *B60W 30/16* (2013.01); *B60W 30/17* (2013.01); *B60W 30/182* (2013.01); *B60W 30/18109* (2013.01); *B60W 30/18145* (2013.01); *G05D 1/0088* (2013.01); *B60K 2310/242* (2013.01); *B60K 2310/244* (2013.01); *B60K 2310/262* (2013.01); *B60K 2310/264* (2013.01); *B60W 2050/0088* (2013.01); *B60W 2550/141* (2013.01); *B60W 2550/22* (2013.01); *B60W 2550/402* (2013.01); *B60W 2720/10* (2013.01); *B60W 2720/106* (2013.01); *B60W 2750/308* (2013.01); *G05D 2201/0213* (2013.01)

(58) Field of Classification Search
CPC ........ B60K 2310/262; B60K 2310/264; B60K 230/242; B60W 2050/0088; B60W 2550/141; B60W 2550/22; B60W 2550/402; B60W 2720/10; B60W 2720/106; B60W 2750/308; B60W 10/04; B60W 10/184; B60W 30/143; B60W 30/16; B60W 30/17; B60W 30/18109; B60W 30/18145; B60W 30/14; B60W 30/182; B60W 30/181; B60W 40/06; B60W 40/08; B60W 40/105; B60W 2040/0872; B60W 2520/10; B60W 2550/14; B60W 2550/10; B60W 2550/308; B60Y 2300/14; B60Y 230/18091

See application file for complete search history.

(56) References Cited

U.S. PATENT DOCUMENTS

| | | |
|---|---|---|
| 2014/0371981 A1 | 12/2014 | Nordbruch et al. |
| 2015/0166063 A1 | 6/2015 | Ishihara |
| 2016/0159251 A1 | 6/2016 | Ebina et al. |
| 2017/0203770 A1 | 7/2017 | Kondo |
| 2018/0259956 A1* | 9/2018 | Kawamoto ........... B60W 40/09 |

FOREIGN PATENT DOCUMENTS

| | | |
|---|---|---|
| JP | H10-238617 A | 9/1998 |
| JP | H10-309961 A | 11/1998 |
| JP | 2010-012852 A | 1/2010 |
| JP | 2012-51441 A | 3/2012 |
| JP | 2014-180894 A | 9/2014 |
| JP | 2015024746 A | 2/2015 |
| JP | 2015116919 A | 6/2015 |
| JP | 2015133050 A | 7/2015 |
| WO | 2016013325 A1 | 1/2016 |
| WO | 2016090282 A1 | 6/2016 |
| WO | 2016109540 A1 | 7/2016 |

* cited by examiner

FIG. 7

| TRAVEL STATE | DEFINITION |
|---|---|
| b1. EXPRESSWAY | EXPRESSWAY |
| b2. TRUNK ROAD | NORMAL ROAD WITH TWO OR MORE LANES ON EACH SIDE |
| b3. NON-TRUNK ROAD | NORMAL ROAD WITH ONE LANE ON EACH SIDE |
| b4. INTERSECTION | INTERSECTION OF NORMAL ROAD |
| b5. CRUISE TRAVEL | NORMAL ROAD OR EXPRESSWAY, NO PRECEDING VEHICLE |
| b6. FOLLOWING TRAVEL | NORMAL ROAD OR EXPRESSWAY, PRECEDING VEHICLE PRESENT |
| b7. INTERSECTION PASSING | INTERSECTION OF NORMAL ROAD, STOP AND THEN RESTART |
| b8. RIGHT TURN | INTERSECTION OF NORMAL ROAD, RIGHT TURN |

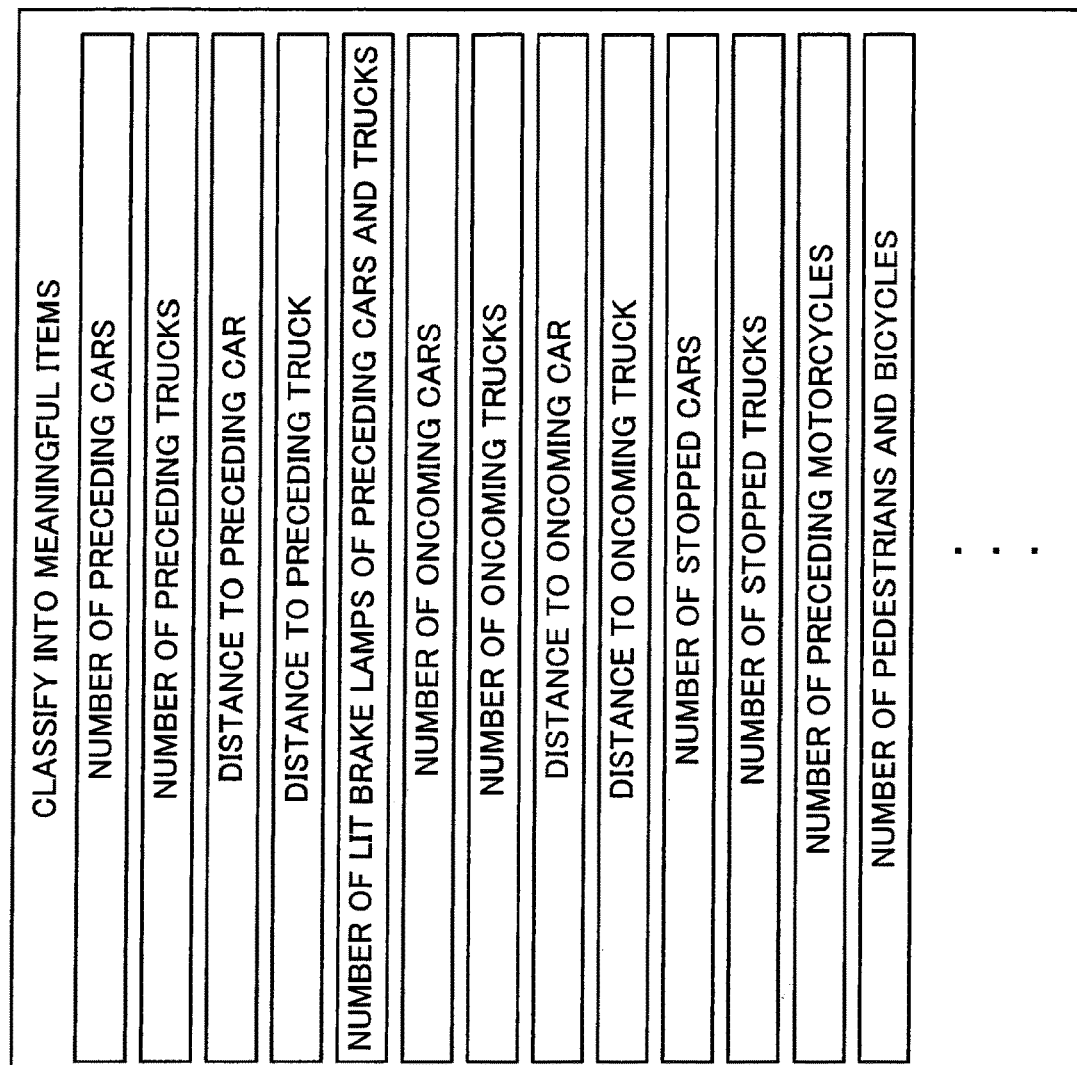
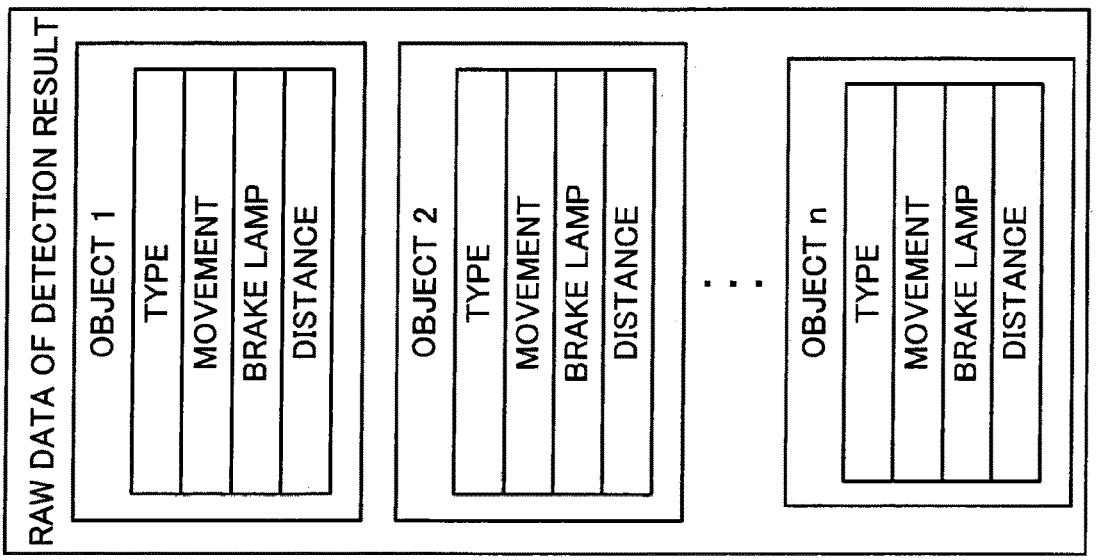
FIG 8

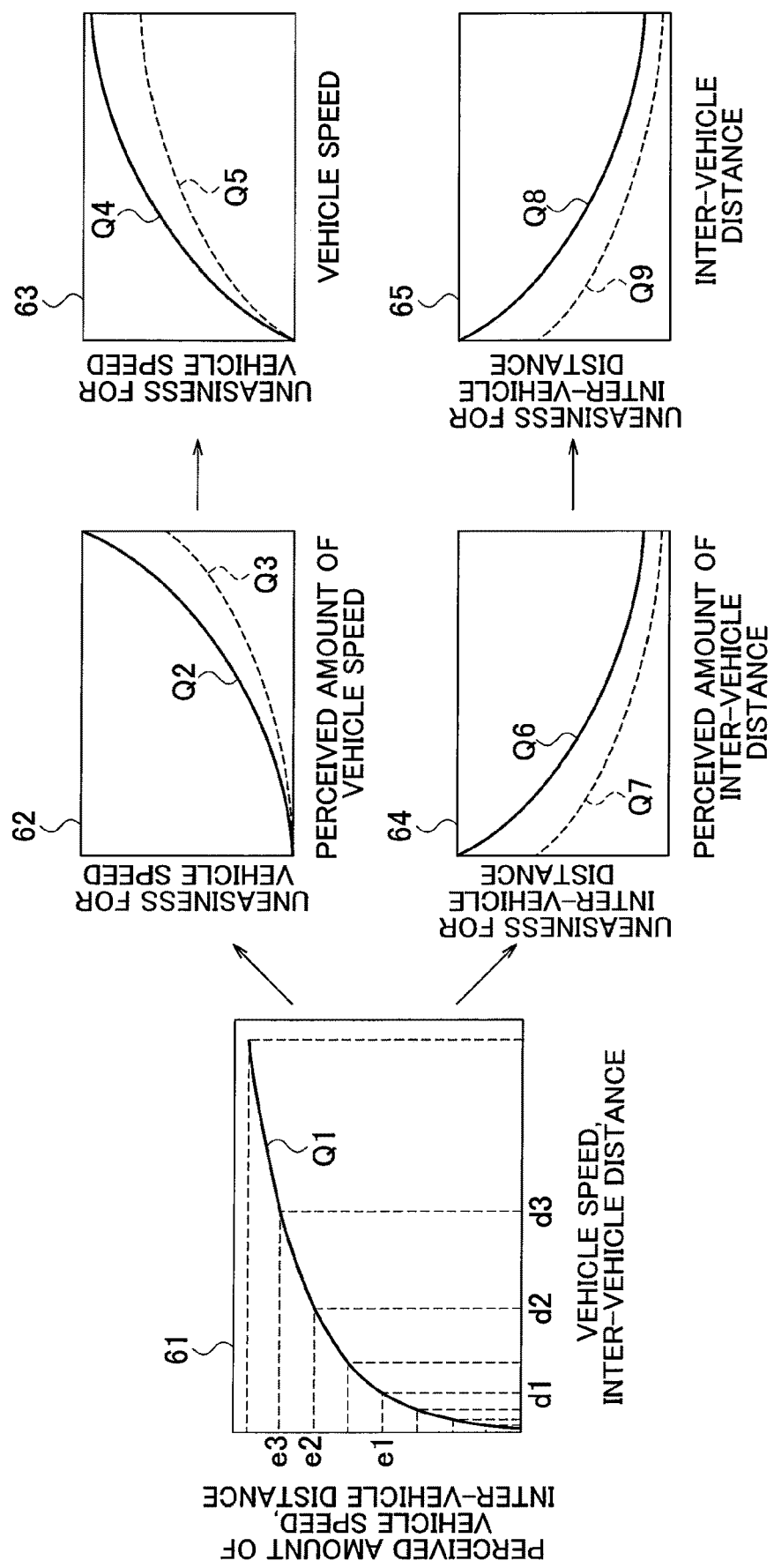

FIG. 15

| CONTROL PARAMETER | | CURRENT TRAVEL STATE | T1 | T2 |
|---|---|---|---|---|
| VEHICLE SPEED (SPEED INCREASE) | | VEHICLE SPEED IS LOW | SHORT | TAKE TIME TO INCREASE SPEED |
| | | VEHICLE SPEED IS HIGH | LONG | INCREASE SPEED QUICKLY |
| | | ROAD WIDTH IS SMALL | LONG | TAKE TIME TO INCREASE SPEED |
| | | ROAD WIDTH IS LARGE | SHORT | INCREASE SPEED QUICKLY |
| INTER-VEHICLE DISTANCE (APPROACHING) | | INTER-VEHICLE DISTANCE IS SHORT | LONG | TAKE TIME TO APPROACH PRECEDING VEHICLE |
| | | INTER-VEHICLE DISTANCE IS LONG | SHORT | APPROACH PRECEDING VEHICLE QUICKLY |
| | | THERE IS ANOTHER VEHICLE IN ADJACENT LANE | LONG | TAKE TIME TO APPROACH PRECEDING VEHICLE |
| | | THERE IS NO VEHICLE IN ADJACENT LANE | SHORT | APPROACH PRECEDING VEHICLE QUICKLY |

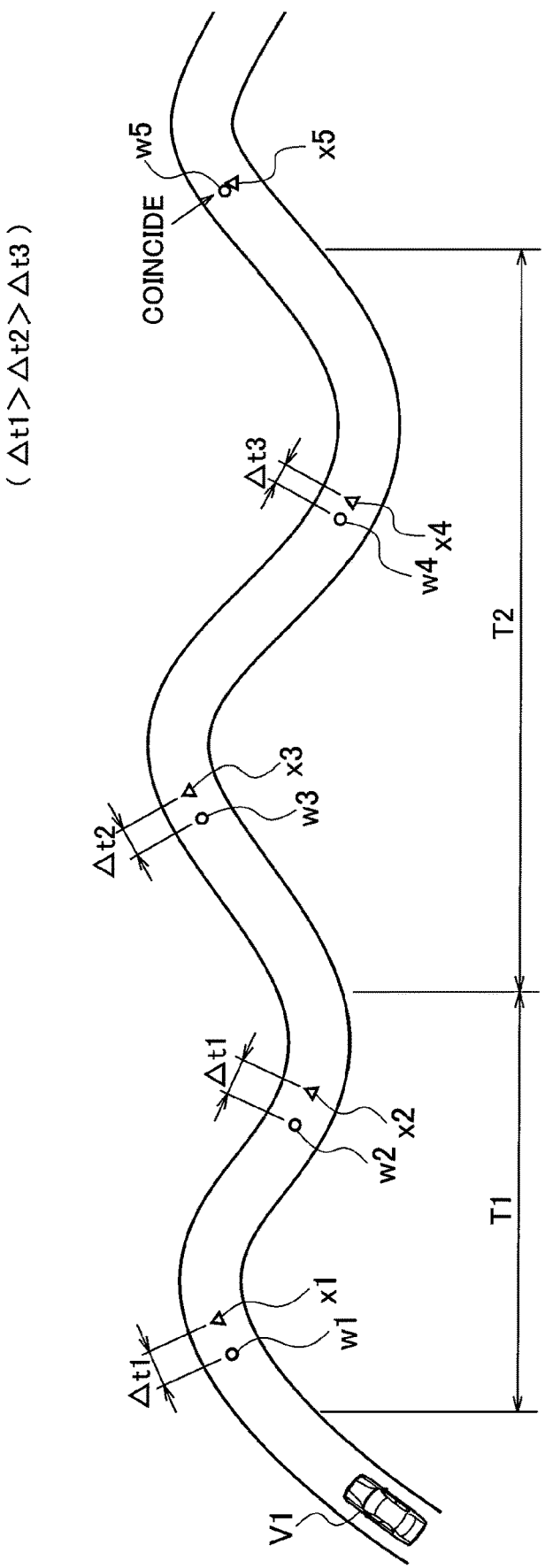

CONTROL METHOD AND CONTROL DEVICE OF AUTOMATIC DRIVING VEHICLE

TECHNICAL FIELD

The present invention relates to a control method and a control device of an automatic driving vehicle.

BACKGROUND

As disclosed in Japanese Patent Application Publication No. 2012-51441, there is proposed a technique in which a control device of an automatic driving vehicle switches from manual driving to automatic driving by switching to the automatic driving when not detecting override.

However, the conventional example disclosed in Japanese Patent Application Publication No. 2012-51441 does not consider changes in driving characteristics during the switching from the manual driving to the automatic driving. Accordingly, the conventional example has a problem that an occupant feels uneasy during the switching from the manual driving to the automatic driving.

SUMMARY

The present invention has been made to solve such a conventional problem and an object thereof is to provide a control method and a control device of an automatic driving vehicle which can suppress uneasiness of an occupant in switching from manual driving to automatic driving.

In one aspect of the present invention, when switching from manual driving to automatic driving is performed, the automatic driving is performed with manual driving characteristics maintained, the manual driving characteristics being driving characteristics in the manual driving.

According one aspect of the present invention, uneasiness of the occupant can be suppressed during the switching from the manual driving to the automatic driving.

BRIEF DESCRIPTION OF THE DRAWINGS

FIG. 7 is an explanatory view illustrating classification of travel states;

FIG. 8 is an explanatory view illustrating an example of classifying pieces of data on other vehicles into meaningful items;

FIG. 11 includes graphs illustrating relationships between each of the vehicle speed and the inter-vehicle distance and a perceived amount thereof, relationships between the perceived amounts and the uneasiness, and relationships between each of the vehicle speed and the inter-vehicle distance and the uneasiness;

FIG. 15 is an explanatory view illustrating relationships between the changes in the vehicle speed and the inter-vehicle distance, the maintaining time T1, and the switching time T2.

FIG. 23 is an explanatory view illustrating manual driving characteristics and automatic driving characteristics of driving performed in a modified example of the present invention.

DETAILED DESCRIPTION

Figure 1:
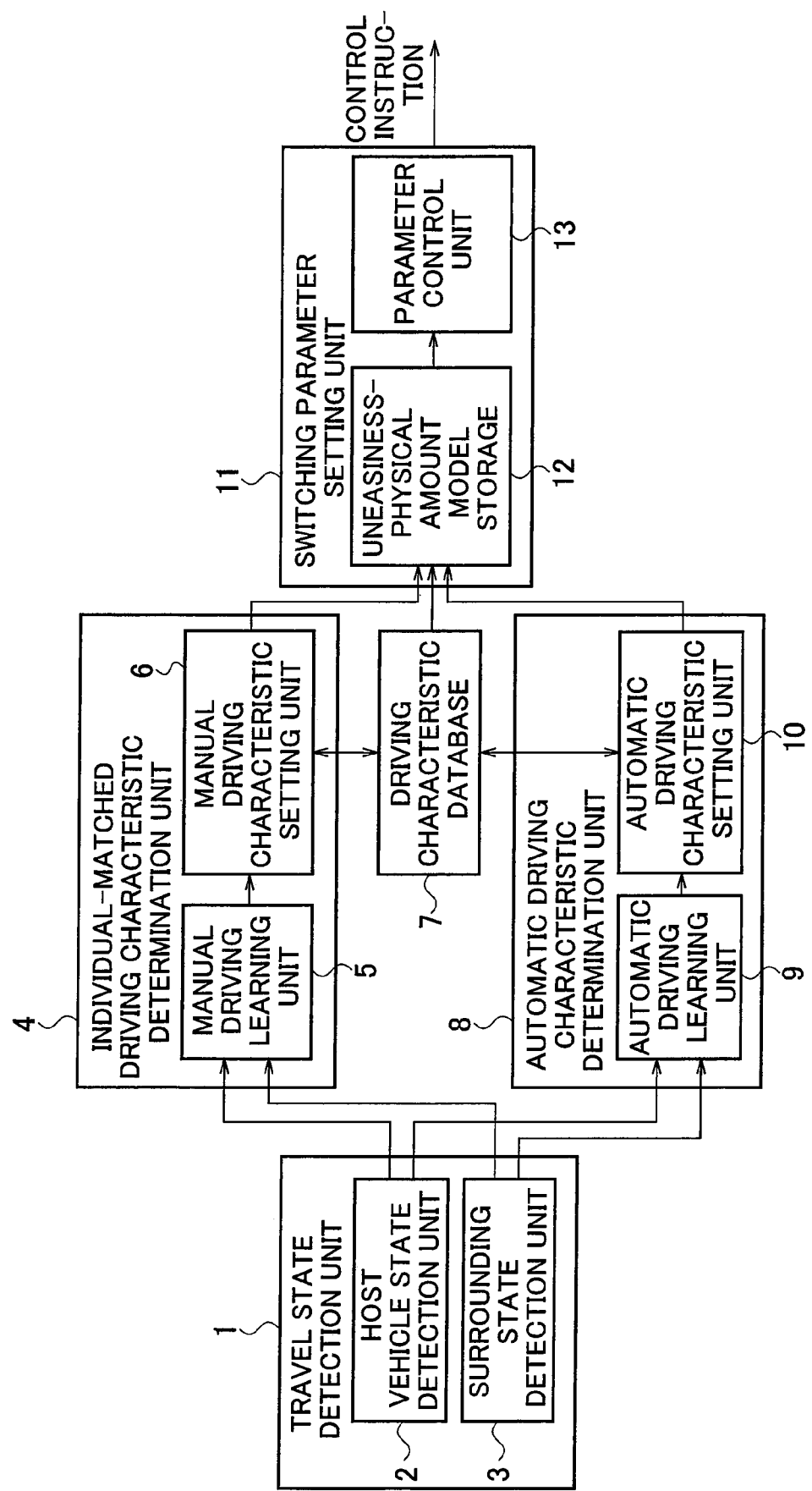
FIG. 1 is a block diagram illustrating a configuration of a control device of an automatic driving vehicle according to one embodiment of the present invention.

An embodiment of the present invention is described below with reference to the drawings. FIG. 1 is a block diagram illustrating a configuration of a control device of an automatic driving vehicle according to one embodiment of the present invention.

As illustrated in FIG. 1, the control device of the automatic driving vehicle according to the embodiment includes a travel state detection unit 1, an individual-matched driving characteristic determination unit 4, a driving characteristic database 7, an automatic driving characteristic determination unit 8, and a switching parameter setting unit 11.

Figure 2:
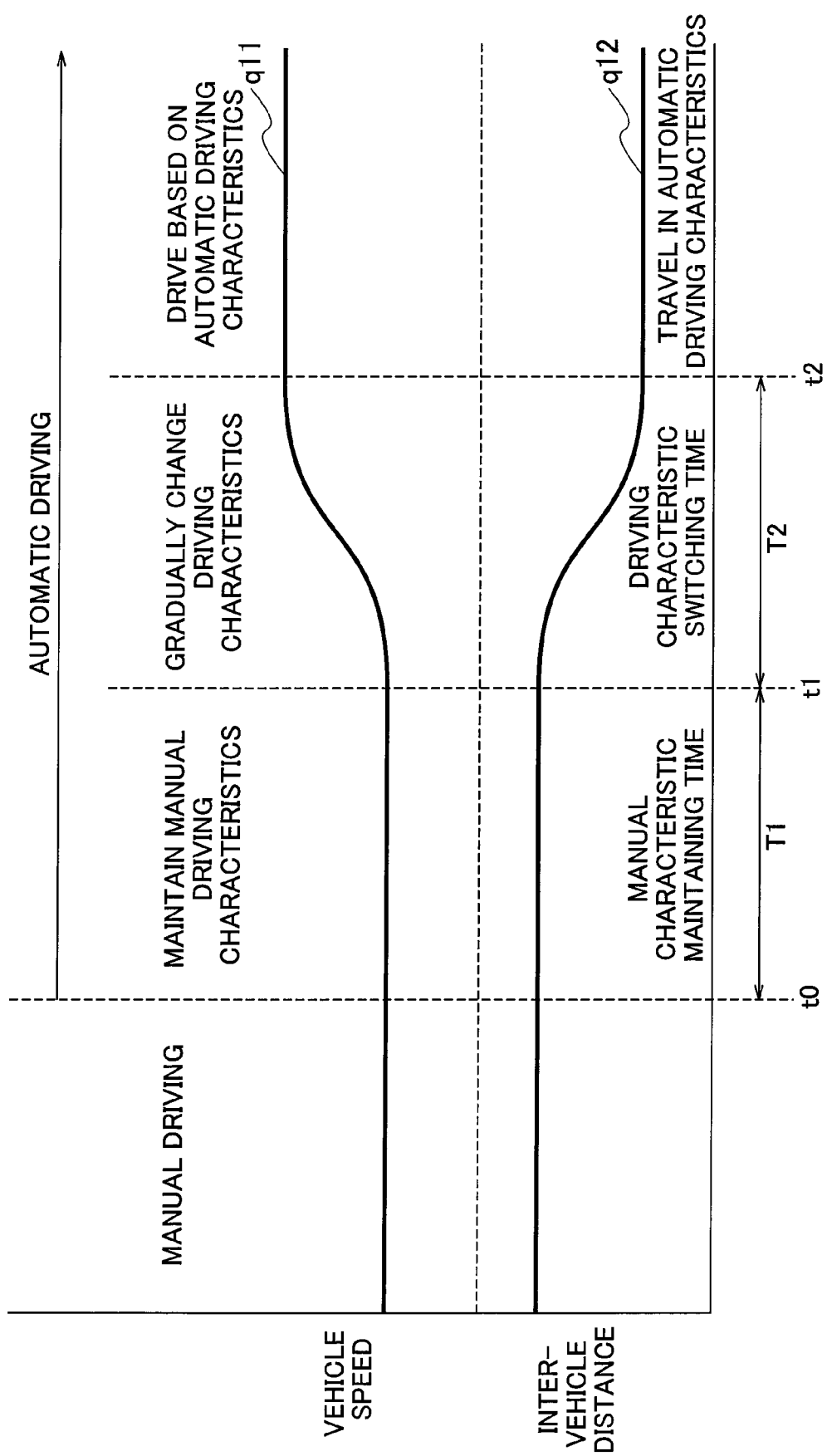
FIG. 2 is an explanatory view illustrating a maintaining time T1, a switching time T2, and changes in vehicle speed and an inter-vehicle distance in switching from manual driving to automatic driving.

In the control device of the automatic driving vehicle according to the embodiment, as illustrated in FIG. 2, when driving is switched to automatic driving during travel in manual driving at a time point t0, automatic driving based on manual driving characteristics is performed for a manual characteristic maintaining time T1 (hereafter, referred to as "maintaining time T1" for short) obtained by a method described later. The manual driving characteristics described herein are driving characteristics in the manual driving by an occupant. The manual driving characteristics include vehicle speed, acceleration, an inter-vehicle distance, steering acceleration, a yaw rate, and the like. The manual driving characteristics are not limited to those described above and any characteristics generally used to indicate characteristics of the vehicle can be employed.

Thereafter, at a time point t1, the driving characteristics are gradually switched to automatic driving characteristics in a driving characteristic switching time T2 (hereafter, referred to as "switching time T2" for short) obtained by the method described later and, at time t2, are completely changed to the automatic driving characteristics. The automatic driving characteristics described herein are driving characteristics different from the manual driving characteristics. The automatic driving characteristics may be characteristics set by learning the characteristics of the manual driving by the occupant or characteristics set for each travel scene (normal road, expressway, or the like) and any conventional driving characteristics of automatic driving may be used. In FIG. 2, the vehicle speed (curve q11) and the inter-vehicle distance (curve q12) are given as examples of physical amounts of the automatic driving vehicle. Note that, in FIG. 2, although the driving characteristics in the automatic driving are illustrated to be switched from the manual driving characteristics to the automatic driving characteristics, the method of changing the driving characteristics is not limited to this and may be any method as long as the driving characteristics in the automatic driving are changed from the driving characteristics in the manual driving to driving characteristics different from these.

The functions described in the embodiment can be implemented by one or multiple processing circuits. The processing circuit includes a processing device with an electric circuit. The processing device also includes devices such as an application-specific integrated circuit (ASIC) and conventional circuit parts designed to execute the functions described in the embodiment.

[Description of Travel State Detection Unit 1]

As illustrated in FIG. 1, the travel state detection unit 1 includes a host vehicle state detection unit 2 which detects the state of the host vehicle and a surrounding state detection unit 3 which detects a surrounding state.

Figure 3:
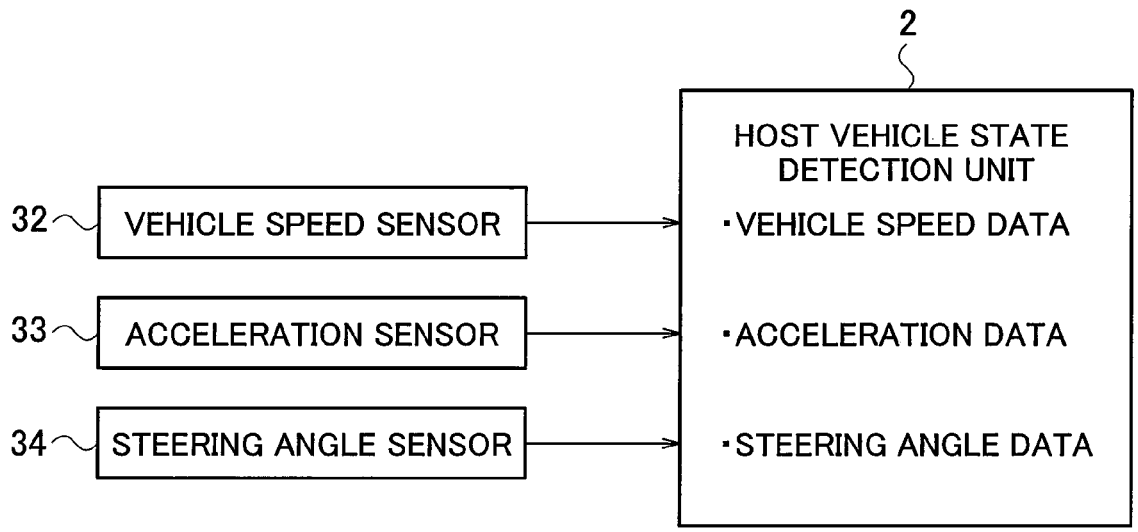
FIG. 3 is a block diagram illustrating a detailed configuration of a host vehicle state detection unit.

As illustrated in FIG. 3, the host vehicle state detection unit 2 obtains vehicle speed data detected by a vehicle speed sensor 32, acceleration data detected by an acceleration sensor 33, and steering angle data detected by a steering angle sensor 34, and detects the travel state of the host vehicle based on these pieces of data. The pieces of data detected in the host vehicle state detection unit 2 are outputted to a manual driving learning unit 5 and an automatic driving learning unit 9 illustrated in FIG. 1.

Figure 4:
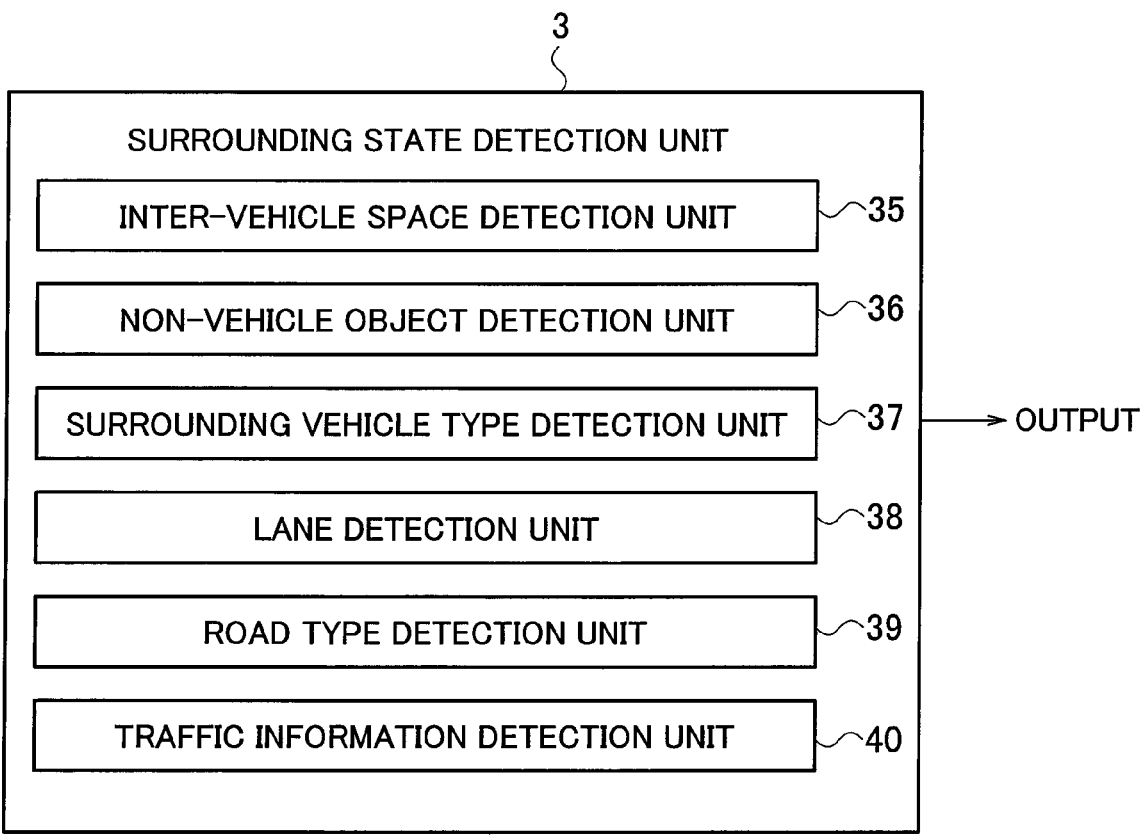
FIG. 4 is a block diagram illustrating a detailed configuration of a surrounding state detection unit.

As illustrated in FIG. 4, the surrounding state detection unit 3 includes an inter-vehicle space detection unit 35, a non-vehicle object detection unit 36, a surrounding vehicle type detection unit 37, a lane detection unit 38, a road type detection unit 39, and a traffic information detection unit 40.

The inter-vehicle space detection unit 35 detects front, rear, left, and right inter-vehicle spaces of the host vehicle by using radar or the like. The non-vehicle object detection unit 36 detects objects other than vehicles such as pedestrians and bicycles in the surroundings of the host vehicle, based on images captured by cameras configured to capture images of the surroundings.

The surrounding vehicle type detection unit 37 detects types of the vehicles in the surroundings of the host vehicle from the images captured by the cameras. For example, the surrounding vehicle type detection unit 37 detects passenger cars, trucks, buses, motorcycles, and the like. The lane detection unit 38 detects lanes in the road from the images captured by the cameras.

The road type detection unit 39 detects the type of the road from information obtained from the navigation device. The traffic information detection unit 40 detects traffic information from information obtained by the navigation device. Note that various pieces of information can be detected by means of communication between the vehicles or communication between the vehicle and the road or can be detected by using sonars or the like. The data detected by the surrounding state detection unit 3 is outputted to the manual driving learning unit 5 and the automatic driving learning unit 9 illustrated in FIG. 1.

[Individual-Matched Driving Characteristic Determination Unit 4, Automatic Driving Characteristic Determination Unit 8]

The individual-matched driving characteristic determination unit 4 includes the manual driving learning unit 5 and a manual driving characteristic setting unit 6. The automatic driving characteristic determination unit 8 includes the automatic driving learning unit 9 and an automatic driving characteristic setting unit 10.

The manual driving learning unit 5 and the automatic driving learning unit 9 determine the type of road on which the vehicle is traveling from various pieces of data (data obtained by the sensors illustrated in FIG. 3) indicating the travel state and detected in the travel state detection unit 1 in the manual driving and learn the driving characteristics of the occupant for each road type. The driving characteristics include vehicle speed, average vehicle speed, acceleration, a yaw rate, braking timing, timing of lane change, a merging point and merging speed upon entering an expressway, and the like in the case where the occupant (for example, driver) is manually driving the vehicle. Performing the automatic driving based on the learned driving characteristics causes the automatic driving to be performed based on the characteristics of the occupant and uneasiness felt by the occupant in the automatic driving can be reduced. Note that the learned driving characteristics may be, for example, in the case of the vehicle speed, one value such as vehicle speed 50 km/h or a range such as 30 km/h to 60 km/h. Moreover, the driving characteristics may be expressed by using a function such as a probability density distribution. Note that, when the occupant instructs changing of the driving characteristics during the automatic driving, the manual driving learning unit 5 and the automatic driving learning unit 9 may learn the instructed driving characteristics and reflect the instructed driving characteristics in the driving characteristics of automatic driving hereafter.

Figure 5:
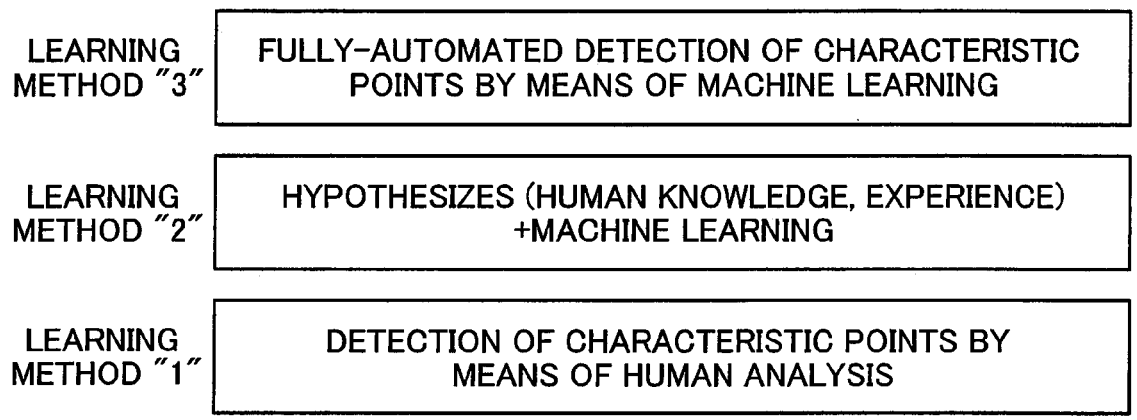
FIG. 5 is an explanatory view illustrating three learning methods of learning characteristics of a driving action by means of machine learning.

Three learning methods are generally known as methods for learning the driving characteristics. FIG. 5 is an explanatory view illustrating the three learning methods. In a learning method "1," learning is performed by means of human analysis. In a learning method "2," hypothesizes are set based on human knowledge and experience and then learning is performed by means of machine learning. In a learning method "3," learning is fully and automatically performed by means of machine learning. In the embodiment, learning is performed with the learning method "2" employed as an example.

Figure 6:
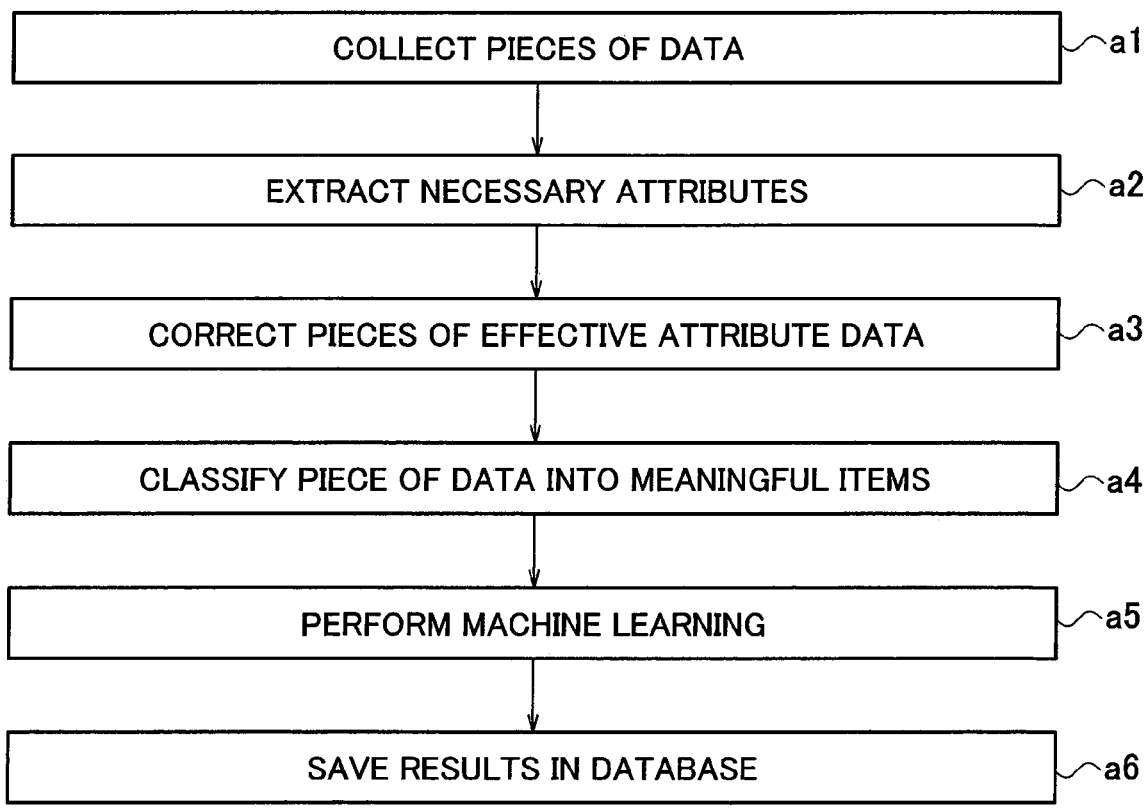
FIG. 6 is an explanatory view illustrating a flow of learning the driving action for detected characteristic points.

FIG. 6 is an explanatory view illustrating a flow of learning the characteristics from the data detected by the travel state detection unit 1. First, in step a1, the manual driving learning unit 5 and the automatic driving learning unit 9 collect pieces of data from the travel state detection unit 1. The travel state and the surrounding state of the host vehicle are collected as the pieces of data. After collecting the pieces of data, in step a2, the manual driving learning unit 5 and the automatic driving learning unit 9 extract necessary pieces of attribute data. Not all pieces of data collected by the travel state detection unit 1 are necessarily related to the driving action and, when pieces of data not related to the driving action are used as learning materials, such pieces of data may have adverse effects on the learning result. Accordingly, only the necessary pieces of data (attribute data) are extracted in the processing of step a2.

In step a3, the manual driving learning unit 5 and the automatic driving learning unit 9 correct the pieces of attribute data extracted in the aforementioned processing of step a2 by removing elements such as noise which are included in the pieces of attribute data and which have adverse effects on learning.

In step a4, the manual driving learning unit 5 and the automatic driving learning unit 9 classifies the pieces of attribute data into meaningful items (parameters). FIG. 8 illustrates an example in which pieces of data on other vehicles are classified into the meaningful items.

Specifically, when objects "1" to "n" which are other vehicles are detected and the "type," "movement," "brake lamp," and "distance from the host vehicle" of each of the other vehicles are detected, the manual driving learning unit 5 and the automatic driving learning unit 9 re-classifies these pieces of data and obtains various items such as "the number of preceding vehicles," the number of preceding trucks," and "distance to each preceding vehicle."

The aforementioned processing in steps a1 to a4 of FIG. 6 are defined as preprocessing and, in step a5, the manual driving learning unit 5 and the automatic driving learning unit 9 perform machine learning while using the parameters generated in the preprocessing as inputs of the machine learning. For example, SOM (Self Organizing Map), SVC (Support Vector Machine Classification), SGD (Stochastic Gradient Decent), logistic regression, and the like can be used as an algorithm of the machine learning.

The type of road on which the host vehicle is traveling is outputted by this machine learning. Roads are classified into various road types (for example b1 to b8) as illustrated in FIG. 7. Specifically, when the host vehicle is traveling on an expressway, "b1. expressway" is set, when traveling on a normal load with two lanes on each side, "b2. trunk road" is set, when traveling on a normal road with one lane on each side, "b3. non-trunk road" is set, and when traveling in an intersection of a normal road, "b4. intersection" is set. Moreover, when the host vehicle is traveling on a normal road or an expressway and there is no preceding vehicle, "b5. cruise travel" is set, when the host vehicle is traveling on a normal road or an expressway and there is a preceding vehicle, "b6. following travel" is set, when the host vehicle stops at an intersection of a normal road and then restarts, "b7. intersection passing" is set, and when the host vehicle turns right at an intersection of a normal road, "b8. right turn" is set.

In step a6, the automatic driving learning unit 9 and the manual driving learning unit 5 save the road type determined by the learning and the driving characteristics in this road type in the driving characteristic database 7.

Figure 9:
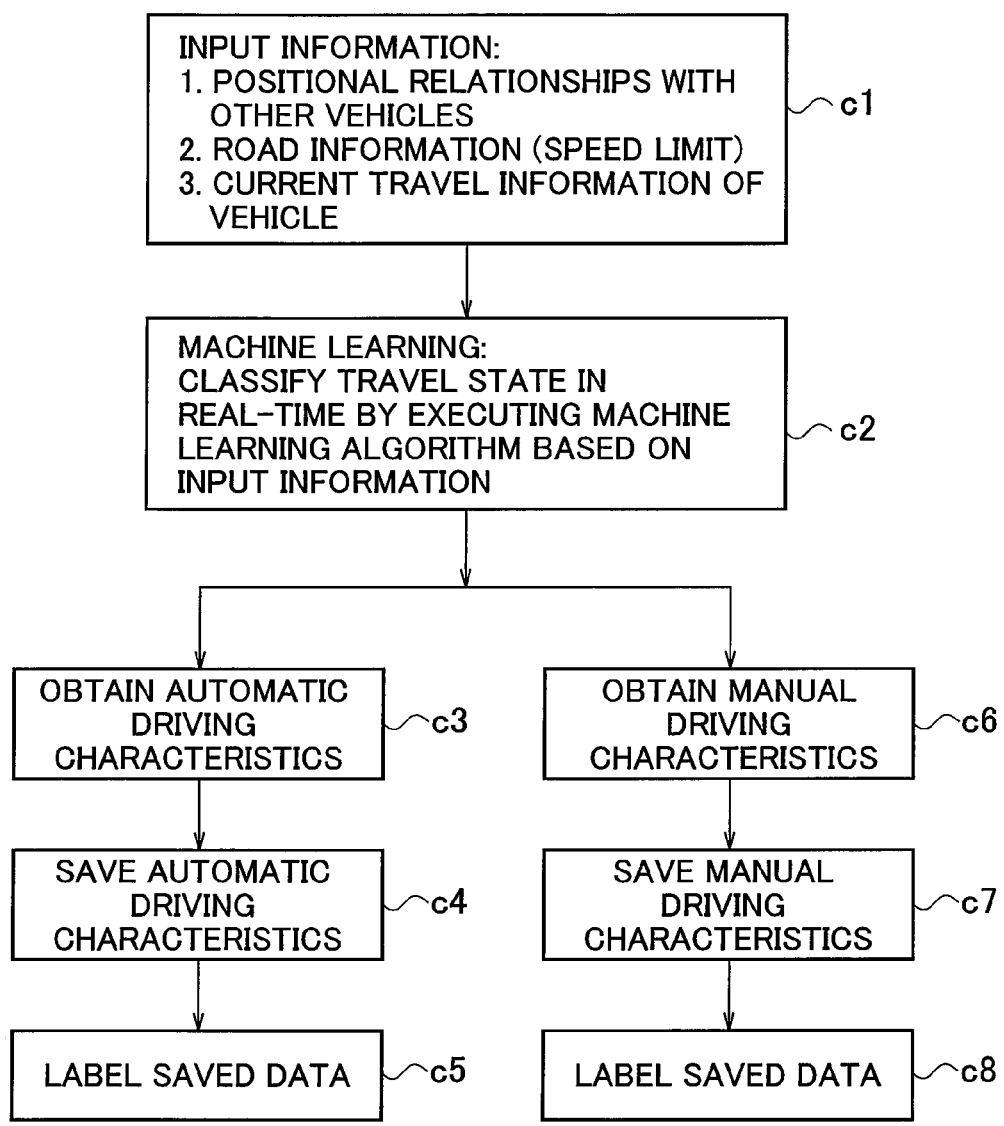
FIG. 9 is a flowchart illustrating steps of performing the machine learning based on input information and obtaining automatic driving characteristics and manual driving characteristics.

FIG. 9 is an explanatory view illustrating processing in which the automatic driving learning unit 9 and the manual driving learning unit 5 save the automatic driving characteristics and the manual driving characteristics in the driving characteristic database 7, for example, in a scene where the host vehicle is cruising on a road with two lanes. In step c1 of FIG. 9, the manual driving learning unit 5 and the automatic driving learning unit 9 obtain various pieces of input information from the travel state detection unit 1. Specifically, the manual driving learning unit 5 and the automatic driving learning unit 9 obtain positional relationships with other vehicles, road information such as speed limit, travel information of the host vehicle, and the like.

In step c2, the automatic driving learning unit 9 and the manual driving learning unit 5 execute a machine learning algorithm based on the obtained pieces of input information as illustrated in FIG. 6. The type of road on which the host vehicle is traveling is thereby determined. In the automatic driving, in steps c3 to c5, the automatic driving learning unit 9 obtains the automatic driving characteristics corresponding to the determined road type from the driving characteristic database 7 and sets them as the driving characteristics in the automatic driving. In the manual driving, in steps c6 to c8, the manual driving learning unit 5 learns the driving characteristics together with the determined road type.

Figure 10A:
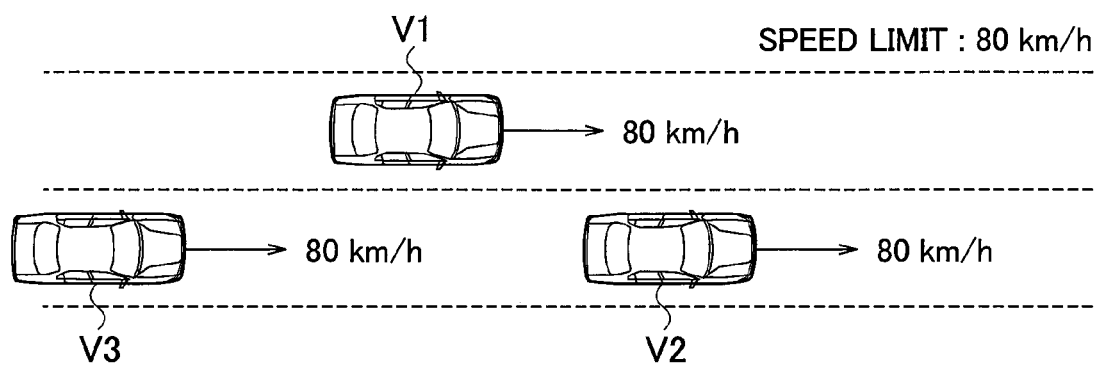
FIG. 10A is an explanatory view of the case where the traveling speed of the host vehicle and the traveling speed of other vehicles traveling in the surroundings are both 80 [km/h]

Steps c3 to c5 in the automatic driving are described. In step c3, the automatic driving learning unit 9 obtains the automatic driving characteristics corresponding to the road type and sets them as the driving characteristics in the automatic driving. For example, FIG. 10(A) illustrates the case where, in a situation in which a host vehicle V1 is cruising on a left lane of a two-lane road and other vehicles V2, V3 are traveling on a right lane of this road, the speed limit is 80 [km/h] and the traveling speed of the other vehicles V2, V3 is 80 [km/h]. When the traveling speed which is the learned driving characteristics in this road type (scene) is 80 [km/h], that is when the occupant drives or is highly likely to drive the vehicle at 80 [km/h] in this scene, the automatic driving learning unit 9 sets the traveling speed of the host vehicle V1 to 80 [km/h].

In step c4, the automatic driving learning unit 9 learns the driving characteristics also during the automatic driving. When the occupant instructs changing of the driving characteristics during the automatic driving, the automatic driving learning unit 9 may learn the instructed driving characteristics. An instruction of the occupant in the automatic driving can be thereby reflected in the driving characteristics of automatic driving hereafter. Then, the automatic driving learning unit 9 saves the driving characteristics in the automatic driving in the driving characteristic database 7. Furthermore, in step c5, the automatic driving learning unit 9 labels the pieces of saved data with the traveled road type to facilitate later reference.

Figure 10B:
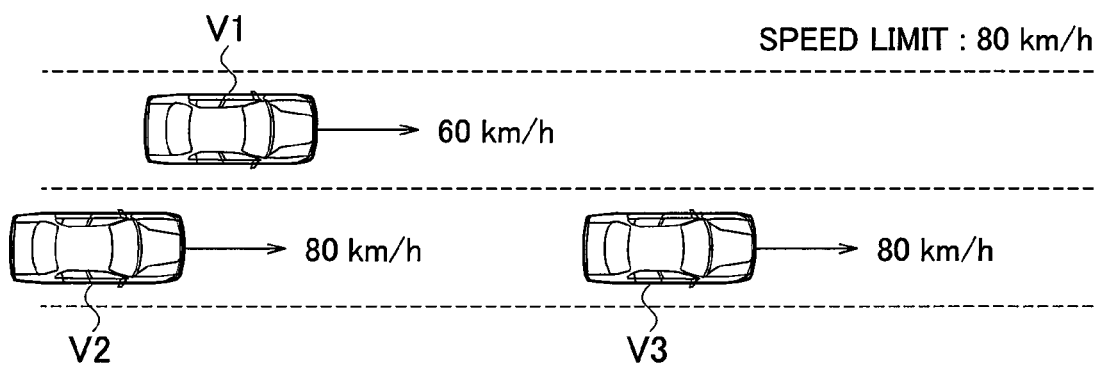
FIG. 10B is an explanatory view of the case where the traveling speed of the host vehicle is 60 [km/h] and the traveling speed of the other vehicles traveling in the surroundings is 80 [km/h]

Meanwhile, in step c6, the manual driving learning unit 5 obtains the manual driving characteristics together with the determined road type. For example, assume that, as illustrated in FIG. 10B, in a situation in which a host vehicle V1 is cruising on a left lane of a two-lane road and other vehicles V2, V3 are traveling on a right lane of this road, the speed limit is 80 [km/h] and the traveling speed of the other vehicles V2, V3 is 80 [km/h]. When the traveling speed of the host vehicle V1 is 60 [km/h] in this state, the manual driving learning unit 5 determines that the occupant tends to travel at speed 75% of the speed limit in curse travel. Note that the cruise travel in the embodiment is defined as travel in which a situation where the inter-vehicle time (numerical value obtained by dividing the inter-vehicle distance by the traveling speed) between the host vehicle and the preceding vehicle is two seconds or more continues for 30 seconds or more.

In step c7, the manual driving learning unit 5 saves the driving characteristics obtained by the learning in the driving characteristic database 7. Then, in step c8, the manual driving learning unit 5 labels the pieces of saved data with the traveled road type to facilitate later reference.

The automatic driving characteristics in the automatic driving of the host vehicle and the manual driving characteristics in the manual driving can be thereby obtained by the learning and be saved in the driving characteristic database 7.

[Switching Parameter Setting Unit 11]

Next, the switching parameter setting unit 11 illustrated in FIG. 1 is described. The switching parameter setting unit 11 includes an uneasiness-physical amount model storage 12 (model storage) and a parameter control unit 13. The uneasiness-physical amount model storage 12 stores uneasiness-physical amount models to be described later.

When the host vehicle is switched from the manual driving to the automatic driving based on the current travel state of the host vehicle and the uneasiness-physical amount models, the parameter control unit 13 estimates the uneasiness felt by the occupant and sets the maintaining time T1 illustrated in FIG. 2 and the switching time T2 taken for switching to the automatic driving characteristics performed after a lapse of the maintaining time T1, depending on the estimated uneasiness.

<Uneasiness-Physical Amount Model Storage 12>

The uneasiness-physical amount model storage 12 stores the uneasiness-physical amount models indicating relationships between the physical amounts in travel of the host vehicle and the uneasiness felt by the occupant. FIG. 11 is an explanatory view illustrating the uneasiness-physical amount models. According to the well-known Weber-Fechner law, as illustrated in the graph 61, it is known that the vehicle speed (or the inter-vehicle distance) and the amount of vehicle speed perceived by the occupant change as illustrated by the curve Q1. The horizontal axis of the graph 61 represents the vehicle speed (or the inter-vehicle distance) and the vertical axis represents the perceived amount of the vehicle speed (or the inter-vehicle distance).

In an example in which the horizontal axis represents the vehicle speed, it can be found that the higher the vehicle speed is, the smaller the change in the perceived amount is for the same vehicle speed change. Specifically, the perceived amount changes from e1 to e2 when the vehicle speed changes from d1 (for example, 20 [km/h]) to d2 (for example, 40 [km/h]). Meanwhile, the perceived amount changes from e2 to e3 when the vehicle speed changes from d2 to d3 (for example, 60 [km/h]). In other words, although the speed increase is 20 [km/h] in both cases, the change in the perceived amount from e1 to e2 is greater than the change in the perceived amount from e2 to e3. This means that the occupant feels that a greater change is occurring in the speed increase of the vehicle from d1 to d2 than in the speed increase from d2 to d3.

Meanwhile, when the horizontal axis of the graph 61 is the inter-vehicle distance between the host vehicle and the preceding vehicle, the smaller the inter-vehicle distance is, the greater the change in the perceived amount is for the same inter-vehicle distance change. This means that, for example, the change in the amount perceived by the occupant in the case where the inter-vehicle distance decreases by 5 m from 10 m to 5 m is greater than that in the case where the inter-vehicle distance decreases by 5 m from 15 m to 10 m.

The graph 62 illustrates relationships between the perceived amount of the vehicle speed and the uneasiness for the vehicle speed. The curve Q2 illustrates characteristics in the case where the road width is small and the curve Q3 illustrates characteristics in the case where the road width is large. It can be found that the higher the perceived amount of the vehicle speed is, the greater the uneasiness for the vehicle speed felt by the occupant is and the smaller the road width is, the greater the uneasiness is.

As illustrated in the graph 63, a model indicating the relationships between the vehicle speed and the uneasiness for the vehicle speed is generated based on the curves Q1, Q2, and Q3. The curve Q4 illustrates the uneasiness for the vehicle speed felt by the occupant in the case where the road width is small and the curve Q5 illustrates that in the case where the road width is large. It can be found that the higher the vehicle speed is, the greater the uneasiness felt by the occupant is and the uneasiness is even greater when the road width is small. The change in the uneasiness in the case where, for example, the vehicle speed increases from 20 [km/h] to 40 [km/h] is greater than the change in the uneasiness in the case where, for example, the vehicle speed increases from 40 [km/h] to 60 [km/h]. In other words, although the speed increase is 20 [km/h] in both cases, the change in the uneasiness in the speed increase from 20 [km/h] to 40 [km/h] is greater than that in the speed increase from 40 [km/h] to 60 [km/h].

Moreover, the perceived amount of the inter-vehicle distance and the uneasiness for the inter-vehicle distance change as illustrated by the curves Q6 and Q7 of the graph 64. The curve Q7 illustrates characteristics in the case where there is no vehicle in an adjacent lane (case where the adjacent lane is vacant) and the curve Q6 illustrates characteristics in the case where there is another vehicle in the adjacent lane (case where the adjacent lane is occupied). It can be found that the smaller the perceived amount of the inter-vehicle distance is (the smaller the distance to the left end of the graph of the curves Q6 and Q7 is), the greater the uneasiness for the inter-vehicle distance felt by the occupant is. Moreover, it can be found that the uneasiness in the case where there is another vehicle in the adjacent lane is greater than that in the case where there is no vehicle in the adjacent lane.

As illustrated in the graph 65, a model indicating relationships between the inter-vehicle distance and the uneasiness for the inter-vehicle distance is generated based on the curves Q1, Q6, and Q7. The curve Q8 illustrates the uneasiness for the inter-vehicle distance felt by the occupant in the case where there is another vehicle in the adjacent lane and the curve Q9 illustrates that in the case where there is no vehicle in the adjacent lane. It can be found that the smaller the inter-vehicle distance is, the greater the uneasiness felt by the occupant is and the uneasiness is even greater when there is another vehicle in the adjacent lane.

The model with the aforementioned characteristics is thus generated and stored in the uneasiness-physical amount model storage 12. The change in the uneasiness in the case where, for example, the inter-vehicle distance decreases from 15 [m] to 10 [m] is smaller than the change in the uneasiness in the case where, for example, the inter-vehicle distance decreases from 10 [m] to 5 [m]. In other words, although the decrease in the inter-vehicle distance is 5 [m] in both cases, the change in the uneasiness in the decrease from 15 [m] to 10 [m] is smaller than that in the decrease from 10 [m] to 5 [m].

<Parameter Control Unit 13>

Figure 12:
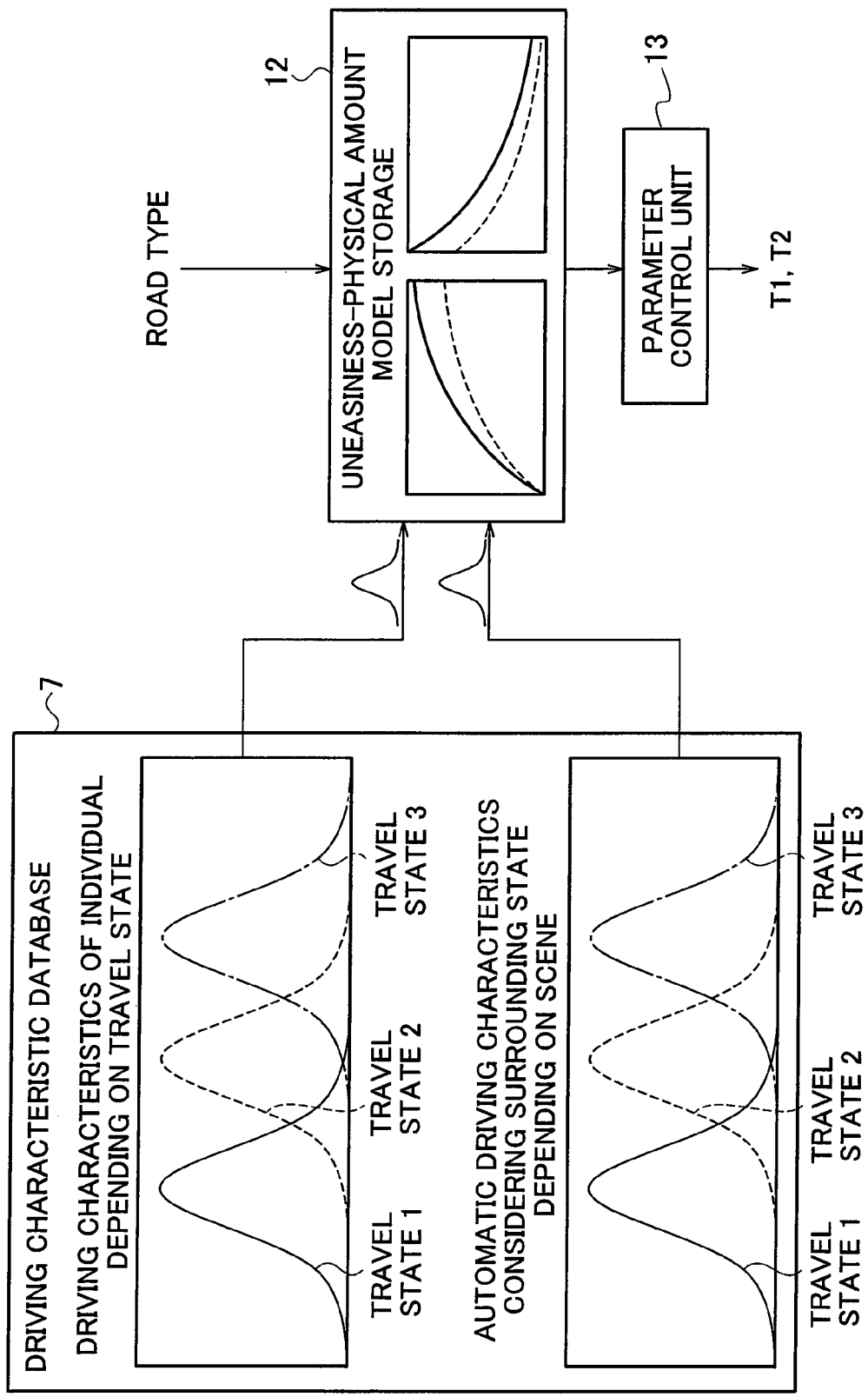
FIG. 12 is an explanatory view of processing of obtaining T1 and T2 based on the automatic driving characteristics and the manual driving characteristics stored in the driving characteristics database and uneasiness-physical amount models.

The uneasiness of the occupant is inputted into the parameter control unit 13 illustrated in FIG. 1 by extracting the manual driving characteristics and the automatic driving characteristics stored in the driving characteristic database 7 according to the road type determined by the machine learning and then referring to the uneasiness-physical amount models as illustrated in FIG. 12. Then, the parameter control unit 13 sets the maintaining time T1 and the switching time T2 taken for the switching from the manual driving to the automatic driving, based on the inputted uneasiness. Note that, in the embodiment, the uneasiness-physical amount models used in the uneasiness-physical amount model storage 12 may be set for each road type.

A method of setting the maintaining time T1 and the switching time T2 performed by the parameter control unit 13 is described below. Specifically, the parameter control unit 13 has a function of a switching controller which performs control of switching from the manual driving to the automatic driving. First, with reference to FIGS. 13 and 14, description is given of changes in the vehicle speed and the inter-vehicle distance which do not make the occupant feel uneasy.

Figure 13A:
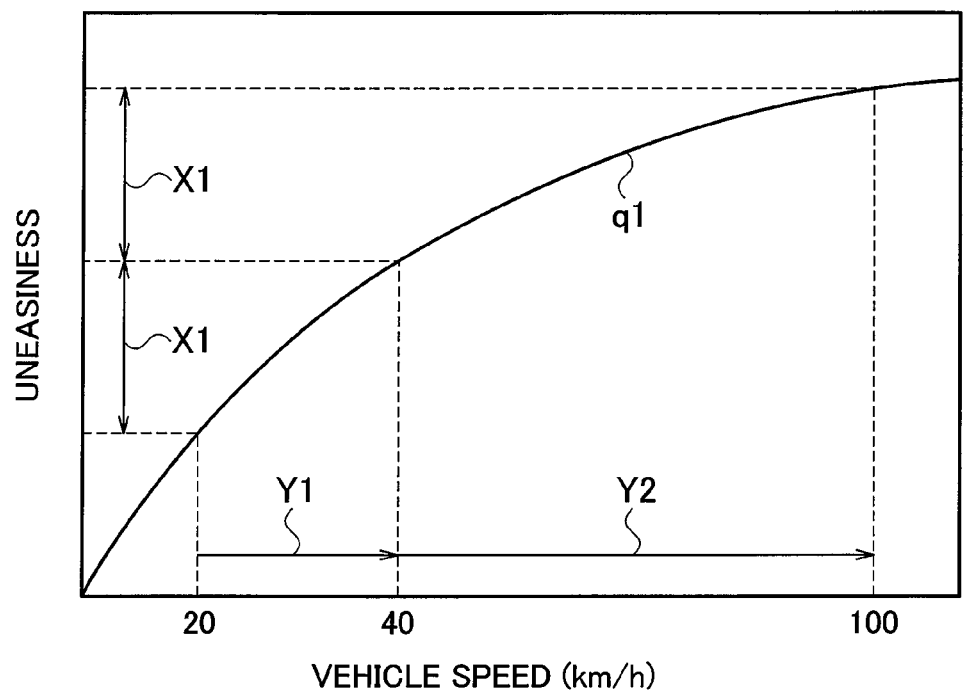
FIG. 13A is a graph illustrating relationships between the vehicle speed and the uneasiness.

As illustrated in FIG. 13A, speed to which the vehicle speed can be increased within a certain time is determined depending on the vehicle speed. The curve q1 is a graph illustrating the relationships between the vehicle speed and the uneasiness felt by the occupant. In the embodiment, an allowable value of a change amount of the uneasiness in the certain time is set as "allowable change amount X1 (first threshold)." The vehicle speed is changed such that the change amount of the uneasiness in the certain time is less than or equal to the allowable change amount X1. Specifically, when the uneasiness is to increase with the switching from the manual driving to the automatic driving, a transition pattern is changed such that the increase amount of the uneasiness in the certain time less than or equal to the first threshold.

In the example illustrated in FIG. 13A, the change amount of the uneasiness in the case where the vehicle speed increases from 20 [km/h] to 40 [km/h] is the allowable change amount X1. Accordingly, when the current vehicle speed is 20 [km/h], the vehicle is allowed to accelerate to 40 [km/h] in the certain time (see arrow Y1).

Meanwhile, when the current vehicle speed is 40 [km/h], the vehicle is allowed to accelerate to 100 [km/h] in the certain time (see arrow Y2). However, when the current vehicle speed is 20 [km/h], the vehicle is not allowed accelerate to 100 [km/h] in the certain time because the change amount of the uneasiness is X1+X1=2X1 and exceeds X1.

Figure 13B:
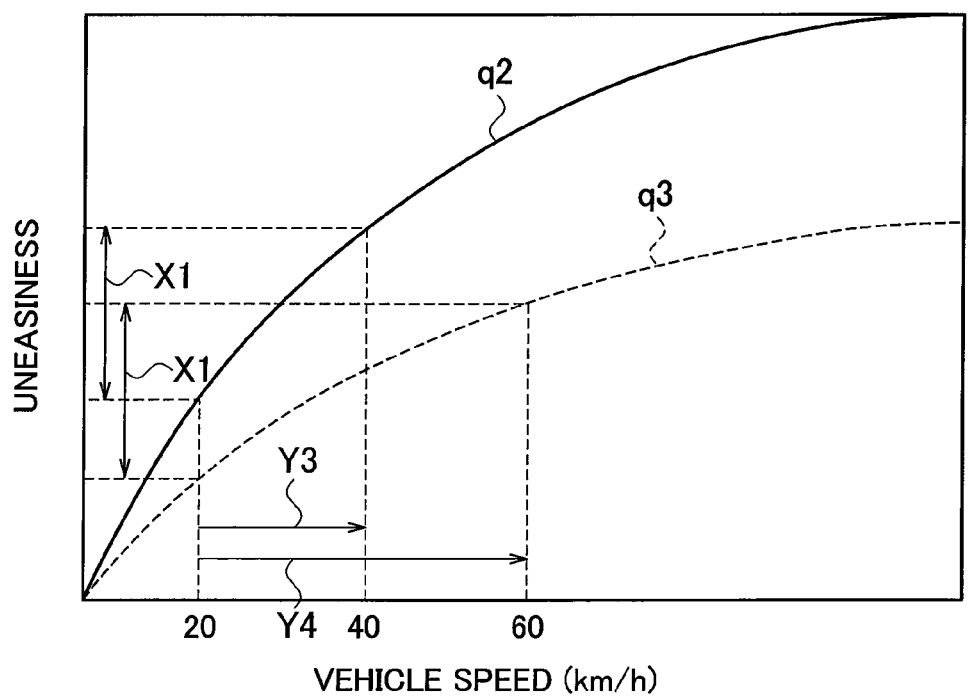
FIG. 13B is a graph illustrating relationships between the vehicle speed and the uneasiness in the case where the road width is small and those in the case where the road width is large.

Moreover, as illustrated in FIG. 13B, the speed to which the vehicle speed can be increased in the certain time is determined depending on the road width and may vary even in a speed increase from the same vehicle speed. The curve q2 is a graph illustrating the relationships of the vehicle speed and the uneasiness felt by the occupant in the case where the road width is small and the curve q3 is a graph illustrating those in the case where the road width is large.

As illustrated by the curve q2, when the current vehicle speed is 20 [km/h] and the road width is small, the vehicle is allowed to accelerate to 40 [km/h] in the certain time (see arrow Y3). Meanwhile, as illustrated by the curve q3, when the current vehicle speed is 20 [km/h] and the road width is large, the vehicle is allowed to accelerate to 60 [km/h] in the certain time (see arrow Y4).

Figure 14A:
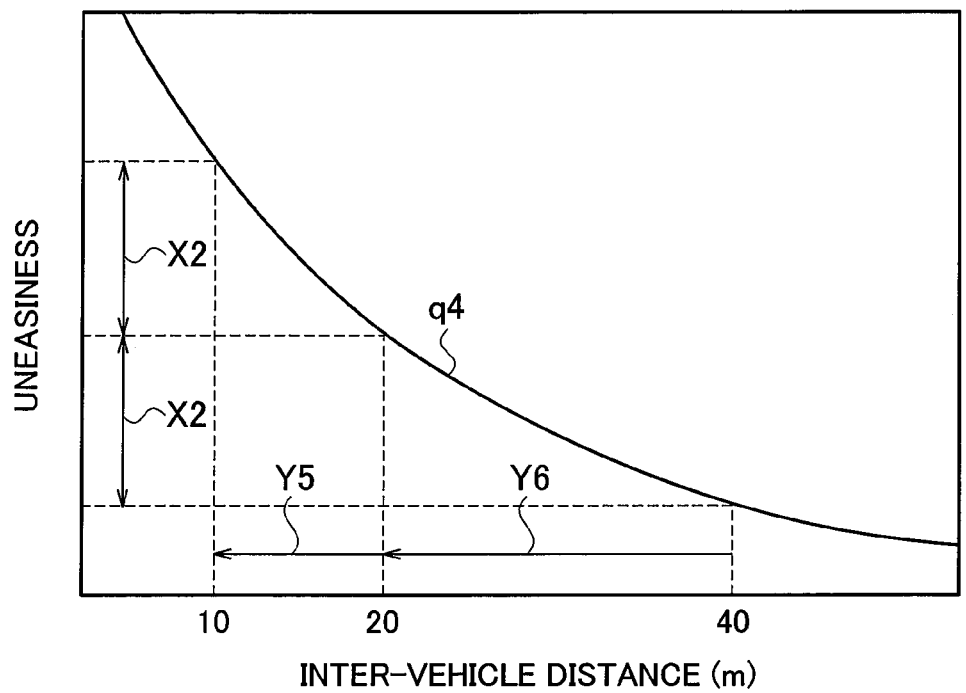
FIG. 14A is a graph illustrating relationships between the inter-vehicle distance and the uneasiness.

Moreover, as illustrated in FIG. 14A, the distance to which the vehicle can approach the preceding vehicle in the certain time is determined depending on the inter-vehicle distance. The curve q4 is a graph illustrating the relationships between the inter-vehicle distance and the uneasiness felt by the occupant. In the embodiment, an allowable value of a change amount of the uneasiness in the certain time is set as "allowable change amount X2 (first threshold)." The inter-vehicle distance is changed such that the change amount of the uneasiness in the certain time is less than or equal to the allowable change amount X2.

In the example illustrated in FIG. 14A, the change amount of the uneasiness in the case where the inter-vehicle distance changes from 20 [m] to 10 [m] is the allowable change amount X2. Accordingly, when the current inter-vehicle distance is 20 [m], the vehicle is allowed to reduce the inter-vehicle distance to 10 [m] in the certain time (see arrow Y5).

Meanwhile, when the current inter-vehicle distance is 40 [m], the vehicle is allowed to reduce the inter-vehicle distance to 20 [m] in the certain time (see arrow Y6).

However, when the current inter-vehicle distance is 40 [m], the vehicle is not allowed to reduce the inter-vehicle distance to 10 [m] in the certain time because the change amount of the uneasiness is X2+X2=2X2 and exceeds X2.

Figure 14B:
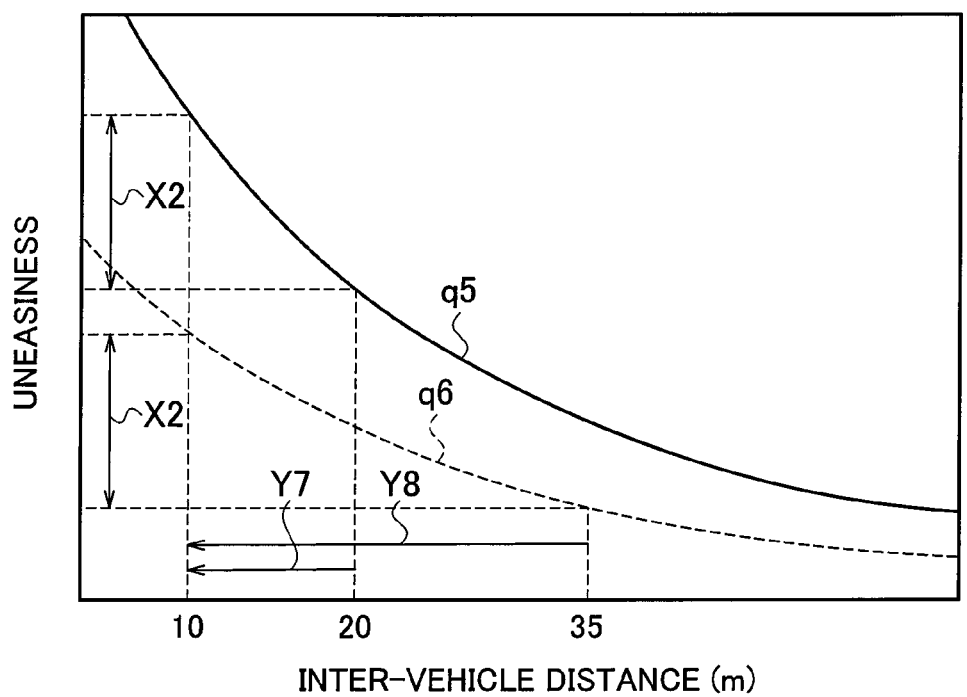
FIG. 14B is a graph illustrating relationships between the inter-vehicle distance and the uneasiness in the case where there is another vehicle in an adjacent lane and those in the case where there is no vehicle in the adjacent lane.

Moreover, as illustrated in FIG. 14B, a reduction amount of the inter-vehicle distance in the certain time is determined depending on whether there is another vehicle in the adjacent lane. The curve q5 illustrates the characteristics in the case where there is another vehicle in the adjacent lane and the curve q6 illustrates the characteristics in the case where there is no vehicle in the adjacent lane.

When there is another vehicle in the adjacent lane, the vehicle is allowed to reduce the inter-vehicle distance from 20 [m] to 10 [m] in the certain time (see arrow Y7). Meanwhile, when there is no vehicle in the adjacent lane, the vehicle is allowed to reduce the inter-vehicle distance from 35 [m] to 10 [m] in the certain time (see arrow Y8).

The parameter control unit 13 sets the maintaining time T1 such that the greater the uneasiness is, the longer the maintaining time T1 is. Moreover, when the vehicle speed is to be changed, the parameter control unit 13 sets the length of the switching time T2 such that the change amount of the uneasiness in the certain time is less than or equal to the allowable change amount X1. Furthermore, when the inter-vehicle distance is to be changed, the parameter control unit 13 sets the length of the switching time T2 such that the change amount of the uneasiness in the certain time is less than or equal to the allowable change amount X2 (first threshold). This can suppress an abrupt change in the uneasiness.

Specifically, the higher the vehicle speed is, the longer the maintaining time T1 is set and the smaller the road width is, the longer the maintaining time T1 is set. Moreover, the shorter the inter-vehicle distance is, the longer the maintaining time T1 is set and, when there is another vehicle in the adjacent lane, the maintaining time T1 is set longer.

Moreover, the transition pattern is set such that the lower the vehicle speed is, the longer the time taken for a speed increase (switching time T2) is and the smaller the road width is, the longer the time taken for a speed increase (switching time T2) is. Furthermore, the transition pattern is set such that the shorter the inter-vehicle distance is, the longer the time taken to approach the preceding vehicle (switching time T2) is and, when there is another vehicle in the adjacent lane, the time taken to approach the preceding vehicle (switching time T2) is longer.

On the other hand, in the case where the control is performed such that the uneasiness felt by the occupant decreases such as, for example, the case where the driving characteristics are switched to reduce the vehicle speed or the case where the driving characteristics are switched to increase the inter-vehicle distance, the transition pattern is set such that a decrease rate of the uneasiness is more than or equal to a preset threshold (second threshold). Specifically, when the uneasiness is to decrease with the switching from the manual driving to the automatic driving, the transition pattern is changed such that the decrease rate of the uneasiness in the certain time is more than or equal to the second threshold.

For example, in the graph illustrated in FIG. 13A, the vehicle speed of the host vehicle is reduced from 100 [km/h] to 40 [km/h] or less in the certain time and the decrease amount of the uneasiness in the certain time is thereby made greater than X1. As another example, the vehicle speed of the host vehicle is reduced from 40 [km/h] to 20 [km/h] or less in the certain time and the decrease amount of the uneasiness in the certain time is thereby made greater than X1. In other words, the control is performed such that the decrease rate of the uneasiness is more than or equal to the second threshold to quickly eliminate the uneasiness felt by the occupant.

Moreover, also for the inter-vehicle distance, in the graph illustrated in FIG. 14A, for example, the inter-vehicle distance is increased from 10 [m] to 20 [m] or more in the certain time and the decrease amount of the uneasiness in the certain time is thereby made greater than X2. As another example, the inter-vehicle distance is increased from 20 [m] to 40 [m] or more in the certain time and the decrease amount of the uneasiness in the certain time is thereby made greater than X2.

Specifically, the transition pattern is set such that the higher the vehicle speed is, the shorter the time taken for the speed reduction (switching time T2) is and the larger the road width is, the shorter the time taken for the speed reduction (switching time T2) is. Moreover, the transition pattern is set such that the longer the inter-vehicle distance is, the shorter the move-away time from the preceding vehicle (switching time T2) is and, when there is no vehicle in the adjacent lane, the move-away time from the preceding vehicle (switching time T2) is shorter.

As described above, during the switching from the manual driving to the automatic driving, the parameter control unit 13 calculates the maintaining time T1 and also calculates the switching time T2 to the performing of the automatic driving based on automatic driving characteristics. Moreover, the parameter control unit 13 sets the transition pattern of the driving characteristics in the switching time T2.

FIG. 15 is a view illustrating an example of setting the maintaining time T1 and the switching time T2. FIG. 15 illustrates a method of setting T1 in the case where the control parameter for which the occupant feels uneasy is the vehicle speed and the speed is to be increased and a method of setting T1 in the case where the control parameter is the inter-vehicle distance and the inter-vehicle distance is to be reduced.

When the current vehicle speed is low, T1 is set short and the switching time T2 is set long to avoid abrupt speed increase from low speed and reduce the uneasiness of the occupant. When the current vehicle speed is high, T1 is set long and the switching time T2 is set short to quickly increase the speed. The uneasiness of the occupant can be thereby reduced. Moreover, when the road width is small, T1 is set long and T2 is set long to gradually reduce the inter-vehicle distance and reduce the uneasiness of the occupant. When the road width is large, T1 is set short and T2 is set short to quickly increase the speed.

Moreover, when the current inter-vehicle distance is short, T1 is set long and T2 is set long to increase the time taken to reduce the inter-vehicle distance, thereby avoiding abrupt approaching to the preceding vehicle and reducing the uneasiness of the occupant. Moreover, when the current inter-vehicle distance is long, T1 is set short and T2 is set short to quickly reduce the inter-vehicle distance. Moreover, when there is another vehicle in the adjacent lane, T1 is set long and T2 is set long to reduce the uneasiness of the occupant. When there is no vehicle in the adjacent lane, T1 is set short and T2 is set short to quickly reduce the inter-vehicle distance.

Setting the maintaining time T1 and the switching time T2 as described above enables switching of the driving characteristics while reducing the uneasiness felt by the occupant. As a result, the case where the occupant feels uneasy can be avoided.

Figure 16A:
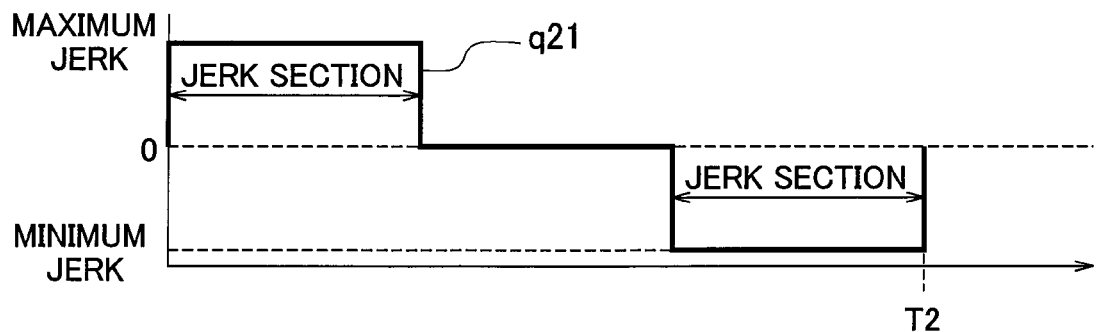
FIG. 16A is a graph illustrating jerk sections in changing of the vehicle speed.

Next, other methods of setting the switching time T2 are described. FIG. 16 is an explanatory view illustrating a method of setting the switching time T2 in the case where the vehicle speed is to be changed. In a speed increase, a jerk (change rate in acceleration) needs to be prevented from exceeding a certain value to prevent the occupant from feeling uneasy. Accordingly, as illustrated in FIG. 16A, a bent line q21 is determined in which jerk sections are set and the maximum jerk and the minimum jerk in these jerk sections are set. In this case, it is preferable that a section of the maximum jerk, a section of the minimum jerk, and a section where the jerk is zero have the same length.

Figure 16B:
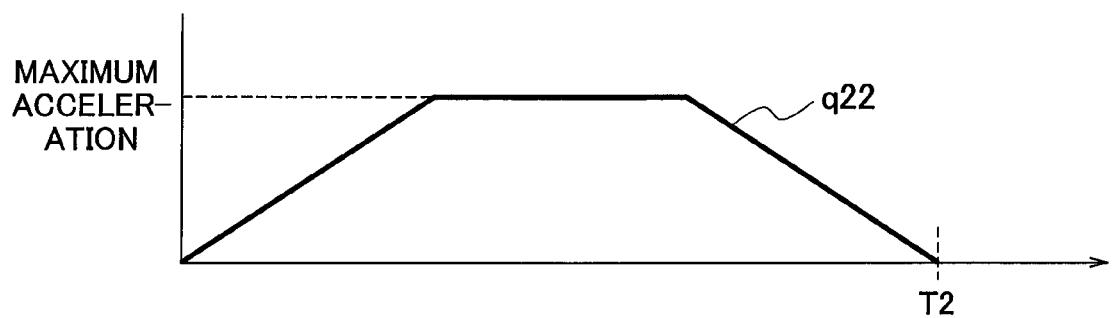
FIG. 16B is a graph illustrating changes in acceleration in the changing of the vehicle speed.
Figure 16C:
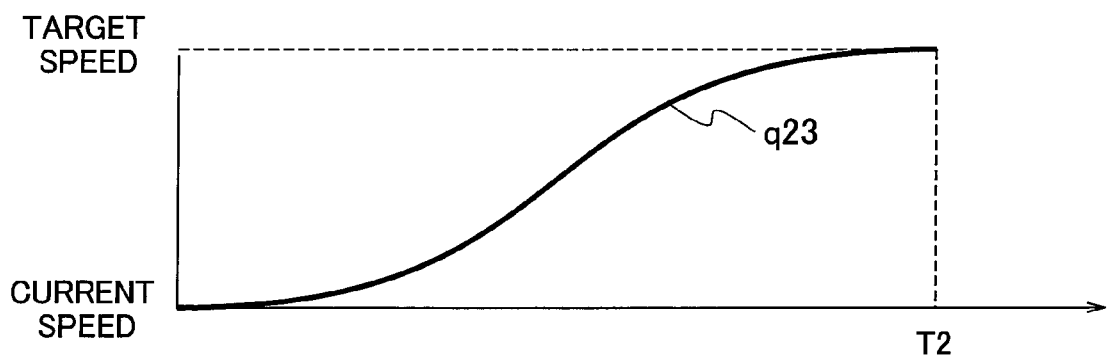
FIG. 16C is a graph illustrating speed changes in the changing of the vehicle speed.

Then, the bent line q21 is integrated to obtain a bent line q22 indicating the acceleration as illustrated in FIG. 16B. Next, the bent line q22 is integrated to obtain a curve q23 indicating speed as illustrated in FIG. 16C. The curve q23 is set such that the speed change from the current speed to a target speed forms a smooth S-shaped curve. Moreover, time the vehicle takes to reach the target speed from the current speed is set as the switching time T2.

Setting the switching time T2 in such a method enables a speed increase which gives no feeling of excessive acceleration to the occupant.

FIG. 17 is an explanatory view illustrating a method of setting the switching time T2 in the case where the vehicle speed is to be increased by 20 [km/h]. FIGS. 17A and 17B illustrate the case where the vehicle speed is increased from 40 [km/h] to 60 [km/h]. As illustrated in FIG. 17B, when the current vehicle speed is low, the parameter control unit 13 sets the switching time T2 long in addition to setting the maintaining time T1 short.

Figure 17A:
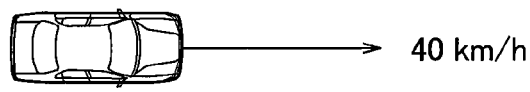
FIG. 17A is an explanatory view illustrating a state where the host vehicle is traveling at 40 [km/h]
Figure 17B:
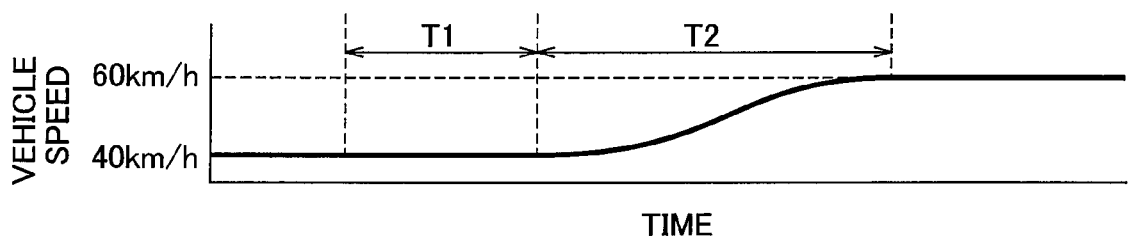
FIG. 17B is a graph illustrating changes in the vehicle speed in the case where the vehicle speed is increased from 40 [km/h] to 60 [km/h]
Figure 17C:
FIG. 17C is an explanatory view illustrating a state where the host vehicle is traveling at 80 [km/h]
Figure 17D:
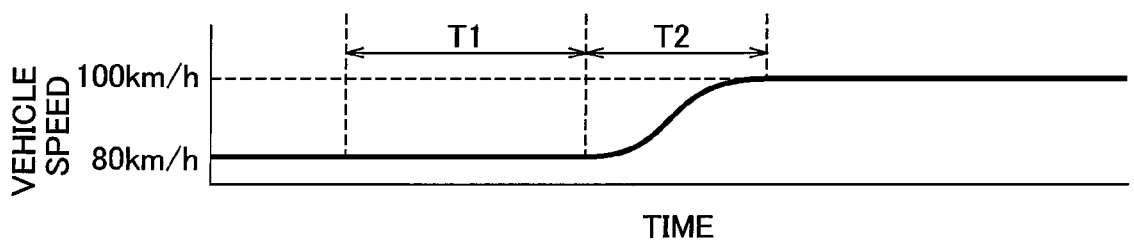
FIG. 17D is a graph illustrating changes in the vehicle speed in the case where the vehicle speed is increased from 80 [km/h] to 100 [km/h]

Meanwhile, FIGS. 17C and 17D illustrate the case where the vehicle speed is increased from 80 [km/h] to 100 [km/h]. When the current vehicle speed is high, as illustrated in FIG. 17D, the parameter control unit 13 sets the switching time T2 short in addition to setting the maintaining time T1 long. This can reduce the uneasiness felt by the occupant. Specifically, during the switching from the manual driving to the automatic driving, the uneasiness felt by the occupant at the start of the automatic driving in the case where the vehicle speed is 80 [km/h] is greater than that in the case where the vehicle speed is 40 [km/h]. Moreover, while the driving characteristics are changed from the manual driving characteristics to the automatic driving characteristics after the switching to the automatic driving, the changing of the driving characteristics increases the uneasiness of the occupant. Accordingly, it is preferable to reduce the uneasiness of the occupant before the changing of the driving characteristics from the manual driving characteristics is started. Specifically, setting the maintaining time T1 longer as the vehicle speed becomes higher can reduce the uneasiness of the occupant before the end of the maintaining time. Accordingly, it is possible to suppress an excessive increase in the uneasiness of the occupant while the driving characteristics are changed to the automatic driving characteristics.

Moreover, even in the same speed increase of 20 [km/h], the uneasiness felt by the occupant in a speed increase from 40 [km/h] to 60 [km/h] is greater than that in a speed increase from 80 [km/h] to 100 [km/h]. Accordingly, the switching time T2 is set longer in the speed increase from 40 [km/h] to 60 [km/h] to reduce the uneasiness.

FIG. 18 is an explanatory view illustrating a method of setting the switching time T2 in the case where the vehicle speed is to be increased from 40 [km/h] to 60 [km/h]. FIG. 18A illustrates the case where the host vehicle V1 is traveling on a road with a small road width H1. When the road width is small, as illustrated in FIG. 18B, the parameter control unit 13 sets the switching time T2 long in addition to setting the maintaining time T1 long.

Figure 18A:
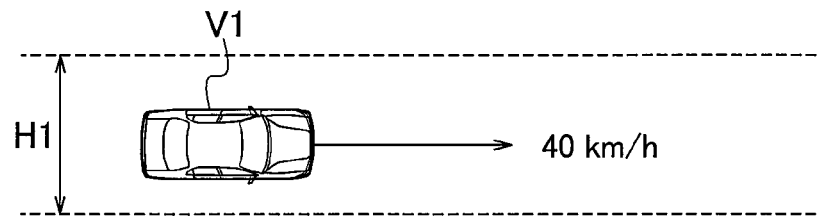
FIG. 18A is an explanatory view illustrating a state where the host vehicle is traveling on a road with a small road width at 40 [km/h]
Figure 18B:
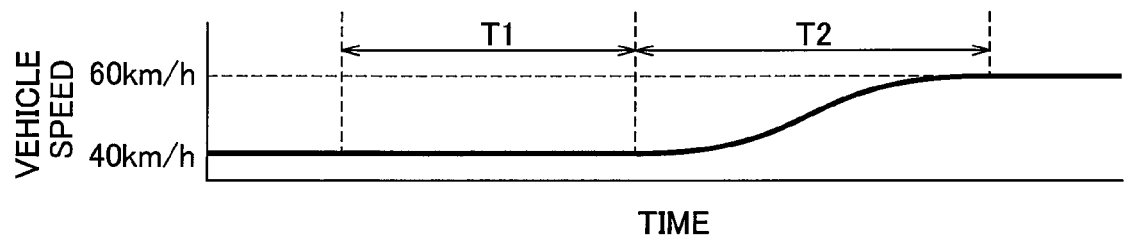
FIG. 18B is a graph illustrating changes in the vehicle speed in the case where the vehicle speed is increased from 40 [km/h] to 60 [km/h] while the vehicle is traveling on the road with a small road width.
Figure 18C:
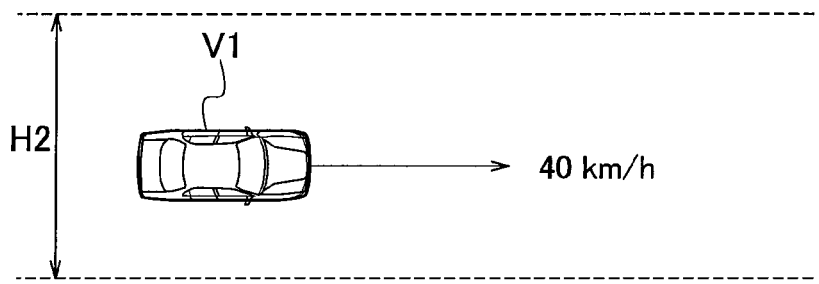
FIG. 18C is an explanatory view illustrating a state where the host vehicle is traveling on a road with a large road width at 40 [km/h]
Figure 18D:
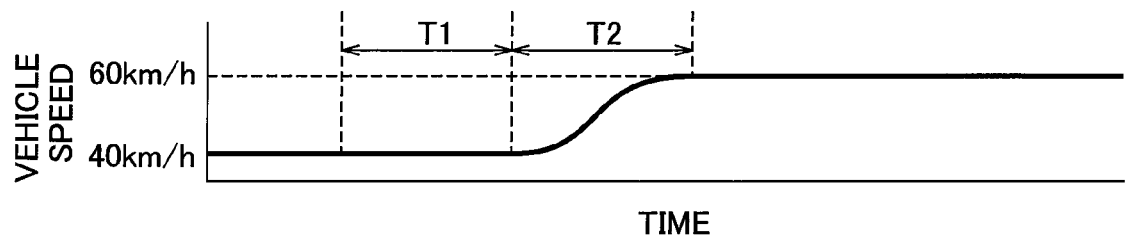
FIG. 18D is a graph illustrating changes in the vehicle speed in the case where the vehicle speed is increased from 40 [km/h] to 60 [km/h] while the vehicle is traveling on the road with a large road width.

Meanwhile, FIGS. 18C and 18D illustrate the case where a road width H2 of a road on which the host vehicle is traveling is large. When the road width is large, as illustrated in FIG. 18D, the parameter control unit 13 sets the switching time T2 short in addition to setting the maintaining time T1 short. This can reduce the uneasiness felt by the occupant. Specifically, even in the same speed increase from 40 [km/h] to 60 [km/h], the uneasiness felt by the occupant in the case where the road width is small is greater and T1 and T2 are thus set longer in this case to reduce the uneasiness.

FIG. 19 is an explanatory view illustrating a method of setting the switching time T2 in the case where the inter-vehicle distance is to be reduced by 30 [m]. FIGS. 19A and 19B illustrate the case where the inter-vehicle distance is to be changed from 50 [m] to 20 [m]. When the current inter-vehicle distance is short, as illustrated in FIG. 19B, the parameter control unit 13 sets the switching time T2 long in addition to setting the maintaining time T1 long.

Figure 19A:
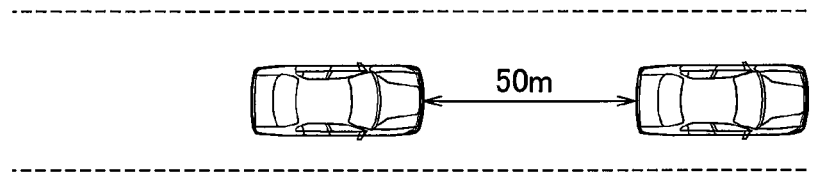
FIG. 19A is an explanatory view illustrating a state where the host vehicle is traveling with the inter-vehicle distance being 50 [m]
Figure 19B:
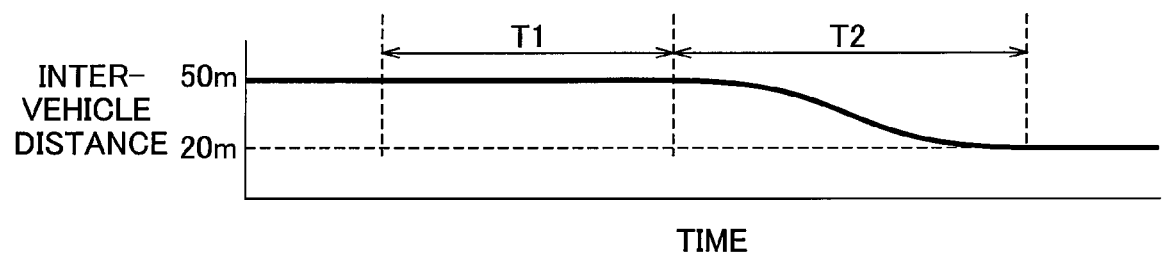
FIG. 19B is a graph illustrating changes in the inter-vehicle distance in the case where the inter-vehicle distance is reduced from 50 [m] to 20 [m]
Figure 19C:
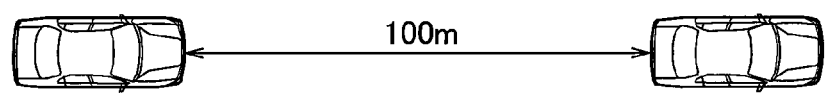
FIG. 19C is an explanatory view illustrating a state where the host vehicle is traveling with the inter-vehicle distance being 100 [m]
Figure 19D:
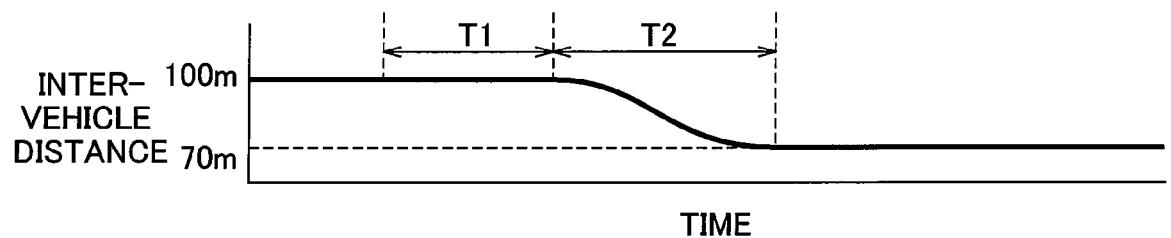
FIG. 19D is a graph illustrating changes in the inter-vehicle distance in the case where the inter-vehicle distance is reduced from 100 [m] to 70 [m]

Meanwhile, FIGS. 19C and 19D illustrate the case where the inter-vehicle distance is to be changed from 100 [m] to 70 [m]. When the current inter-vehicle distance is long, as illustrated in FIG. 19D, the parameter control unit 13 sets the switching time T2 short in addition to setting the maintaining time T1 short. This can reduce the uneasiness felt by the occupant. Specifically, even in the same approaching of 30 [m], the uneasiness felt by the occupant in the approaching from 50 [m] to 20 [m] is greater than that in the approaching from 100 [m] to 70 [m]. Accordingly, T1 and T2 are set longer in the approaching from 50 [m] to 20 [m] to reduce the uneasiness.

FIG. 20 is an explanatory view illustrating a method of setting the switching time T2 in the case where the inter-vehicle distance is to be reduced from 80 [m] to 50 [m]. FIGS. 20A and 20B illustrate the case where there is another vehicle in the adjacent lane. When there is another vehicle in the adjacent lane, as illustrated in FIG. 20B, the parameter control unit 13 sets the switching time T2 long in addition to setting the maintaining time T1 long.

Figure 20A:
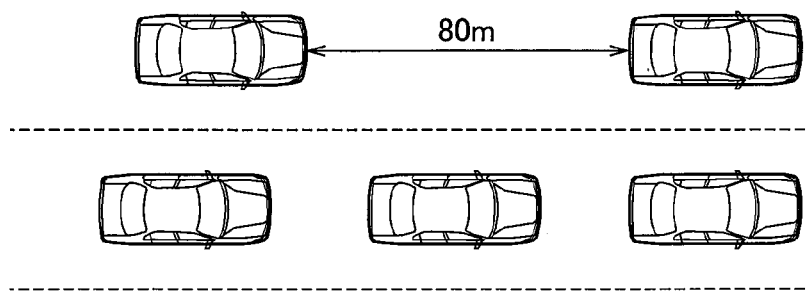
FIG. 20A is an explanatory view illustrating a state where the inter-vehicle distance is 80 [m] and another vehicle is traveling in the adjacent lane.
Figure 20B:
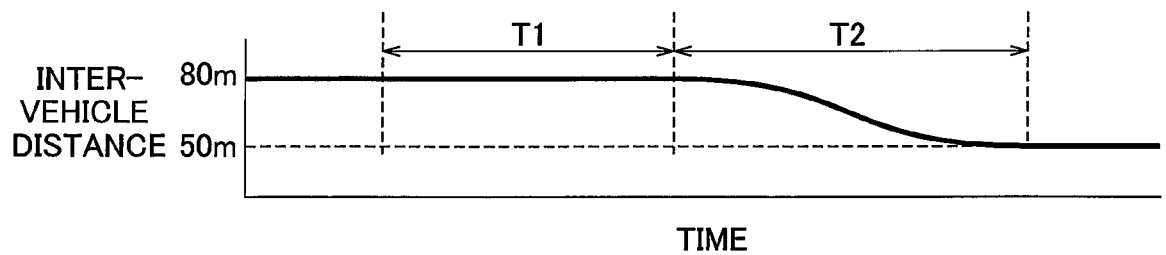
FIG. 20B is a graph illustrating changes in the inter-vehicle distance in the case where there is another vehicle in the adjacent lane and the inter-vehicle distance is reduced from 80 [m] to 50 [m]
Figure 20C:
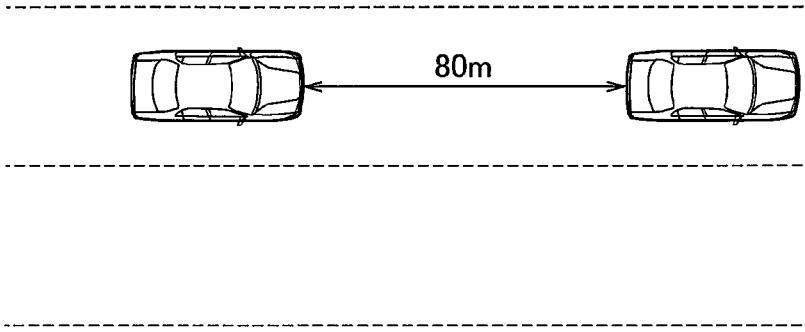
FIG. 20C is an explanatory view illustrating a state where the inter-vehicle distance is 80 [m] and no vehicle is traveling in the adjacent lane.
Figure 20D:
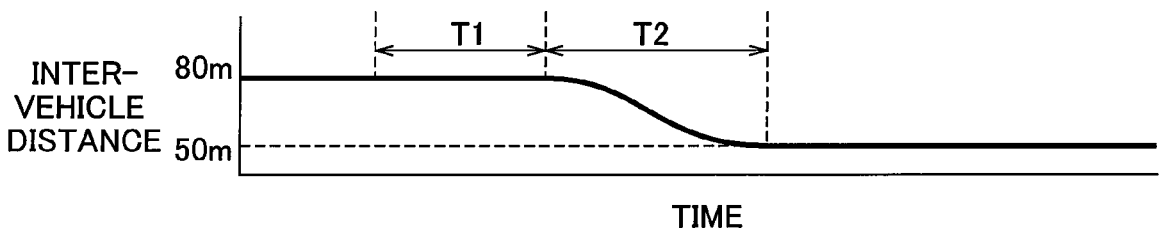
FIG. 20D is a graph illustrating changes in the inter-vehicle distance in the case where there is no vehicle in the adjacent lane and the inter-vehicle distance is reduced from 80 [m] to 50 [m]

Meanwhile, FIGS. 20C and 20D illustrate the case where there is no vehicle in the adjacent lane. When there is no vehicle in the adjacent lane, as illustrated in FIG. 20D, the parameter control unit 13 sets the switching time T2 short in addition to setting the maintaining time T1 short. This can reduce the uneasiness felt by the occupant. Specifically, even in the same approaching from 80 [m] to 50 [m], the uneasiness felt by the occupant in the case where there is another vehicle in the adjacent lane is greater. Accordingly, T1 and T2 are set longer in this case to reduce the uneasiness.

Moreover, when the host vehicle stops at a traffic signal or the like before the total time (T1+T2) of the maintaining time T1 and the switching time T2 elapses, the parameter control unit 13 illustrated in FIG. 1 switches the driving characteristics to the automatic driving characteristics in restart after the stop without using the uneasiness-physical amount models.

Figure 21:
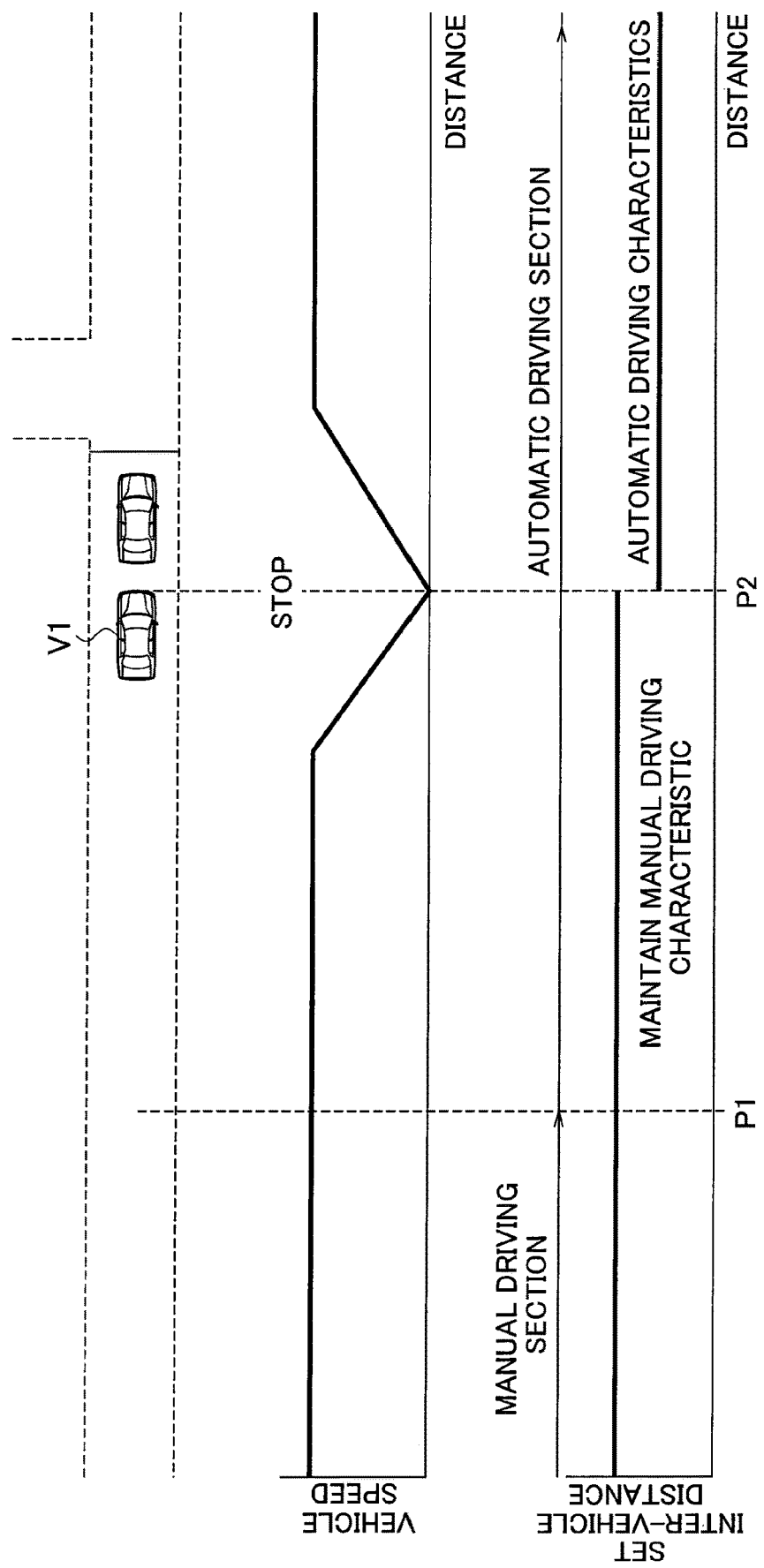
FIG. 21 is an explanatory view illustrating switching of the driving characteristics in the case where the host vehicle stops in the maintaining time T1.

Specifically, as illustrated in FIG. 21, when the driving is switched from the manual driving to the automatic driving at the moment when the host vehicle V1 passes a point P1, the manual driving characteristics are maintained thereafter. Then, when the host vehicle V1 stops at a point P2, the driving characteristics are then switched to the automatic driving characteristics. This can avoid unnecessary switching of the driving characteristics.

[Description of Processing Operation]

Figure 22:
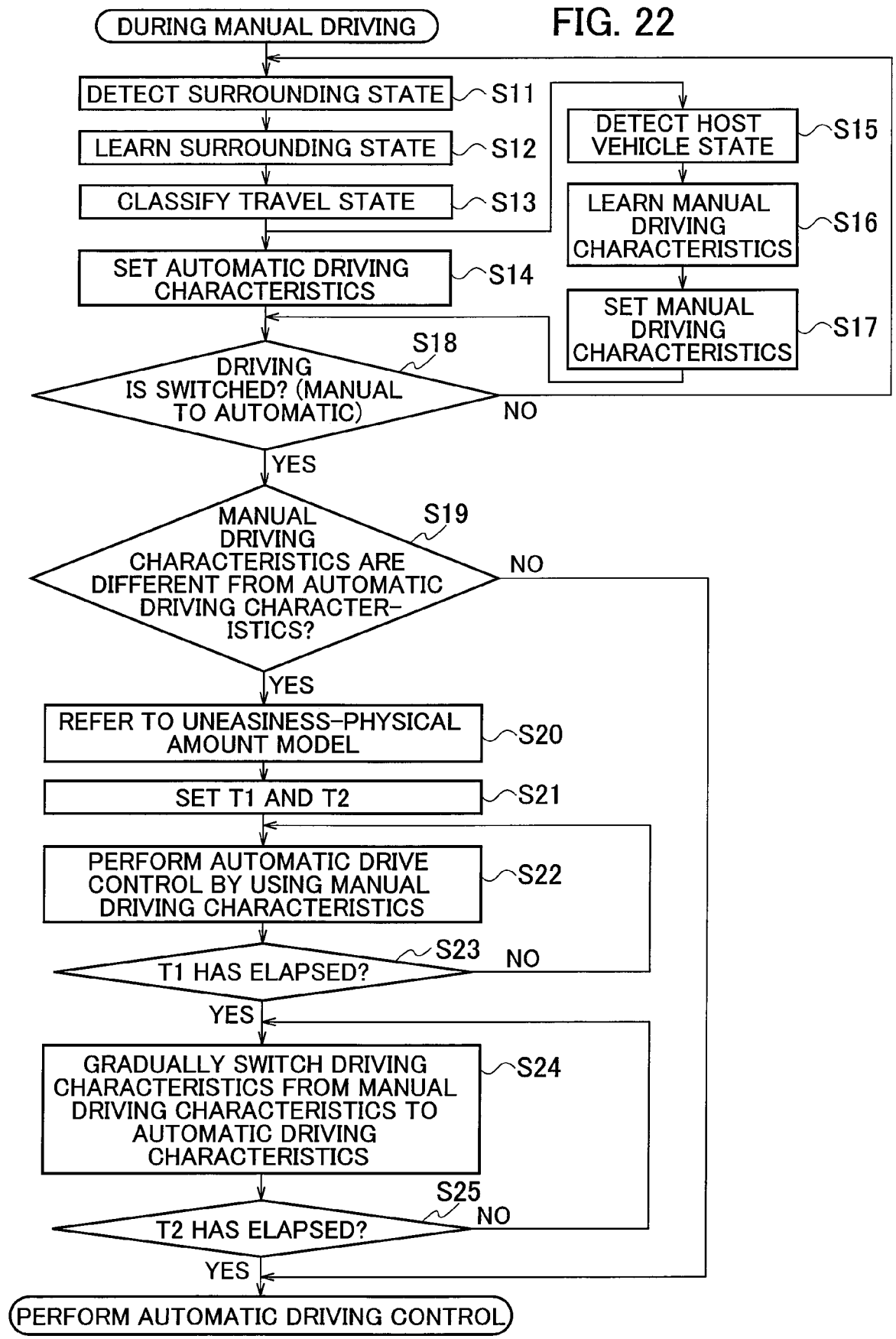
FIG. 22 is a flowchart illustrating processing operations of the control device of the automatic driving vehicle according to the embodiment of the present invention.

Next, an example of a processing operation of the control device in the automatic driving vehicle according to the embodiment is described with reference to the flowchart illustrated in FIG. 22.

First, in step S11, the surrounding state detection unit 3 detects the surrounding state of the host vehicle. In step S12, the automatic driving learning unit 9 statistically learns the detected surrounding state and then, in step S13, classifies the current travel state. Specifically, the automatic driving learning unit 9 classifies the current travel state into one of the travel states such as travel in an expressway and travel in a normal road as illustrated in FIG. 7.

In step S14, the automatic driving characteristic setting unit 10 sets the automatic driving characteristics based on the current travel state by referring to the driving characteristic database 7.

At the same time, in step S15, the host vehicle state detection unit 2 detects the current host vehicle state as illustrated in FIG. 3. In step S16, the manual driving learning unit 5 statistically learns the driving characteristics of the occupant and, in step S17, sets the manual driving characteristics depending on the travel state. Moreover, the driving characteristics learned in the manual driving learning unit 5 are stored in the driving characteristic database 7.

In step S18, the parameter control unit 13 determines whether the switching operation from the manual driving to the automatic driving (override) has occurred.

In step S19, the parameter control unit 13 determines whether the manual driving characteristics set in the processing of step S17 are different from the automatic driving characteristics set in the processing of step S14. When the manual driving characteristics are not different (NO in step S19), the occupant feels no uneasiness during the switching. Accordingly, the transition to the automatic driving control in the automatic driving characteristics is performed as it is.

When the manual driving characteristics are different (YES in step S19), in step S20, the parameter control unit 13 refers to the uneasiness-physical amount model storage 12 and, in step S21, sets the maintaining time T1 and the switching time T2 by using the aforementioned method.

Then, in step S22, the parameter control unit 13 performs the automatic drive control by using the manual driving characteristics.

In step S23, the parameter control unit 13 determines whether T1 has elapsed. When T1 has elapsed (YES in step S23), in step S24, the parameter control unit 13 gradually switches the driving characteristics from the manual driving characteristics to the automatic driving characteristics.

In step S25, the parameter control unit 13 determines whether T2 has elapsed. When T2 has elapsed (YES in step S25), the parameter control unit 13 performs the automatic driving control.

As described above, when the switching operation from the manual driving to the automatic driving occurs, the switching of driving can be performed without causing the occupant to feel uneasy by appropriately setting the maintaining time T1 and the switching time T2.

As described above, in the embodiment, when the driving switches from the manual driving to the automatic driving, the automatic driving is performed with the manual driving characteristics maintained, the manual driving characteristics being the driving characteristics in the manual driving. Accordingly, it is possible to avoid the case where the occupant feels uneasy.

Moreover, the maintaining time T1 (manual driving maintaining time) is set to maintain the manual driving characteristics for the maintaining time T1 and then the switching to the automatic driving characteristics is performed. Accordingly, it is possible to avoid the case where the occupant feels uneasy.

Furthermore, the maintaining time T1 is set based on the relationships between the physical amounts (vehicle speed, inter-vehicle distance, and the like) of the automatic driving vehicle and the uneasiness of the occupant. Accordingly, it is possible to set appropriate maintaining time T1 depending on the travel state of the automatic driving vehicle.

Moreover, when the vehicle speed is high and the occupant is more likely to feel uneasy, the maintaining time T1 is set long. Accordingly, it is possible to more appropriately set the maintaining time T1 and avoid the case where the occupant feels uneasy.

Furthermore, when the road width is small and the occupant is more likely to feel uneasy, the maintaining time T1 is set long. Accordingly, it is possible to more appropriately set the maintaining time T1 and avoid the case where the occupant feels uneasy.

Moreover, when the inter-vehicle distance is short and the occupant is more likely to feel uneasy, the maintaining time T1 is set long. Accordingly, it is possible to more appropriately set the maintaining time T1 and avoid the case where the occupant feels uneasy.

Furthermore, when there is another vehicle in the adjacent lane and the occupant is more likely to feel uneasy, the maintaining time T1 is set long. Accordingly, it is possible to more appropriately set the maintaining time T1 and avoid the case where the occupant feels uneasy.

Moreover, the maintaining time T1 is set based on the uneasiness felt by the occupant. Accordingly, the manual driving characteristics can be maintained without the occupant feeling great uneasiness.

Furthermore, the automatic driving is performed with the driving characteristics in the manual driving maintained and then the automatic driving is performed based on the automatic driving characteristics different from the manual driving characteristics. Accordingly, switching to the automatic driving characteristics can be performed without the occupant feeling uneasy.

Moreover, switching from the manual driving characteristics to the automatic driving characteristics is gradually performed. Accordingly, the uneasiness given to the occupant can be suppressed.

Furthermore, the transition from the manual driving characteristics to the automatic driving characteristics is performed such that the increase amount of the uneasiness in the certain time is less than or equal to the first threshold. Accordingly, uneasiness due to abrupt changes in the driving characteristics can be suppressed.

Moreover, when the vehicle speed is low and the occupant is more likely to feel uneasy, the transition from the manual driving characteristics to the automatic driving characteristics is performed such that the time taken for the speed increase (driving characteristic switching time T2) is long.

Accordingly, it is possible to appropriately set the driving characteristic switching time T2 and suppress an abrupt change in uneasiness.

Furthermore, when the road width is small and the occupant is likely to feel uneasy, the transition from the manual driving characteristics to the automatic driving characteristics is performed such that the time taken for the speed increase (driving characteristic switching time T2) is long. Accordingly, it is possible to appropriately set the driving characteristic switching time T2 and suppress an abrupt change in uneasiness.

Moreover, when the inter-vehicle distance is short and the occupant is likely to feel uneasy, the transition from the manual driving characteristics to the automatic driving characteristics is performed such that the time taken to approach the preceding vehicle (driving characteristic switching time T2) is long. Accordingly, it is possible to appropriately set the driving characteristic switching time T2 and suppress an abrupt change in uneasiness.

Furthermore, when there is another vehicle in the adjacent lane and the occupant is likely to feel uneasy, the transition from the manual driving characteristics to the automatic driving characteristics is performed such that the time taken to approach the preceding vehicle (driving characteristic switching time T2) is long. Accordingly, it is possible to appropriately set the driving characteristic switching time T2 and suppress an abrupt change in uneasiness.

Moreover, the transition from the manual driving characteristics to the automatic driving characteristics is performed such that the decrease amount of the uneasiness in the certain time is more than or equal to the second threshold. Accordingly, the driving characteristics can be quickly switched.

Furthermore, the transition from the manual driving characteristics to the automatic driving characteristics is performed such that the higher the vehicle speed is, the shorter the time taken for the speed reduction (driving characteristic switching time T2) is. Accordingly, it is possible to quickly perform the switching and appropriately set the driving characteristic switching time T2.

Moreover, the transition from the manual driving characteristics to the automatic driving characteristics is performed such that the larger the road width is, the shorter the time taken for the speed reduction (driving characteristic switching time T2) is. Accordingly, it is possible to quickly perform switching and appropriately set the driving characteristic switching time T2.

Furthermore, the transition from the manual driving characteristics to the automatic driving characteristics is performed such that the longer the inter-vehicle distance is, the shorter the time to taken move away from the preceding vehicle (driving characteristic switching time T2) is. Accordingly, it is possible to quickly perform the switching and appropriately set the driving characteristic switching time T2.

Furthermore, the transition from the manual driving characteristics to the automatic driving characteristics is performed such that, when there is no vehicle in the adjacent lane, the time to taken move away from the preceding vehicle (driving characteristic switching time T2) is short. Accordingly, it is possible to quickly perform the switching and appropriately set the driving characteristic switching time T2.

Furthermore, when the vehicle switches from the manual driving to the automatic driving, whether the vehicle has stopped is determined. When the vehicle is determined to have stopped, the transition from the manual driving characteristics to the automatic driving characteristics is performed without setting the maintaining time T1 and the switching time T2. Accordingly, unnecessary calculation can be avoided.

DESCRIPTION OF MODIFIED EXAMPLE

Next, a modified example of the embodiment is described. FIG. 23 is an explanatory view illustrating the modified example. As illustrated in FIG. 23, when the host vehicle V1 travels on a road with a series of curves, a braking operation is performed before each curve. The timing of the braking operation in the travel in the manual driving may vary from that in the travel based on the automatic driving characteristics. In FIG. 23, reference signs x1 to x5 each denote the timing of braking operation based on the automatic driving characteristics. Moreover, reference signs w1 to w5 each denote timing of actual braking operation. In this case, the timing of braking operation is the physical amount of the host vehicle.

When the switching operation from the manual driving to the automatic driving is performed at a time point t0, the braking operation is performed at the reference sign w1 which is the braking operation timing based on the manual driving characteristics. In this case, the reference sign w1 has a time difference $\Delta t1$ to the reference value x1 which is the timing based on the automatic driving characteristics. The time difference $\Delta t1$ is maintained in the maintaining time T1. Specifically, the time difference between the reference signs w2 and x2 is $\Delta t1$.

In the switching time T2, the time difference is gradually reduced such as time differences $\Delta t2$ ($<\Delta t1$) and $\Delta t3$($<\Delta t2$). Then, after the switching time T2 elapses, the reference signs w5 and x5 are made to coincide with each other. The switching from the manual driving to the driving based on the automatic driving characteristics can be thereby performed without causing the occupant to feel uneasy.

Although the control method and the control device of the automatic driving vehicle of the present invention have been described above based on the illustrated embodiment, the present invention is not limited to the embodiment. The configuration of each part may be replaced by any configuration having a similar function.

REFERENCE SIGNS LIST 1 travel state detection unit
2 host vehicle state detection unit
3 surrounding state detection unit
4 individual-matched driving characteristic determination unit
5 manual driving learning unit
6 manual driving characteristic setting unit
7 driving characteristic database
8 automatic driving characteristic determination unit
9 automatic driving learning unit
10 automatic driving characteristic setting unit
11 switching parameter setting unit
12 uneasiness-physical amount model storage (model storage)
13 parameter control unit
32 vehicle speed sensor
33 acceleration sensor
34 steering angle sensor
35 inter-vehicle space detection unit
36 non-vehicle object detection unit
37 surrounding vehicle type detection unit 38 lane detection unit
39 road type detection unit
40 traffic information detection unit
T1 manual characteristic maintaining time (maintaining time)
T2 driving characteristic switching time (switching time)

The invention claimed is:

1. A control method of an automatic driving vehicle switchable between manual driving in which the vehicle is made to travel depending on an operation of an occupant and automatic driving in which driving characteristics in automatic travel are set and the vehicle is made to automatically travel based on the driving characteristics, comprising:
   when performing switching from the manual driving to the automatic driving, performing for a preset manual characteristic maintaining time the automatic driving while maintaining manual driving characteristics which are driving characteristics in the manual driving.

2. The control method of the automatic driving vehicle according to claim 1, further comprising:
   detecting a physical amount in the automatic driving; and
   setting the manual characteristic maintaining time based on the physical amount.

3. The control method of the automatic driving vehicle according to claim 2, further comprising:
   detecting vehicle speed as the physical amount; and
   setting the manual characteristic maintaining time such that the higher the vehicle speed is, the longer the manual characteristic maintaining time is.

4. The control method of the automatic driving vehicle according to claim 2, further comprising:
   detecting a road width as the physical amount; and
   setting the manual characteristic maintaining time such that the smaller the road width is, the longer the manual characteristic maintaining time is.

5. The control method of the automatic driving vehicle according to claim 2, further comprising:
   detecting an inter-vehicle distance as the physical amount; and
   setting the manual characteristic maintaining time such that the shorter the inter-vehicle distance is, the longer the manual characteristic maintaining time is.

6. The control method of the automatic driving vehicle according to claim 2, further comprising:
   detecting whether there is another vehicle in an adjacent lane as the physical amount; and
   when there is the another vehicle, setting the manual characteristic maintaining time longer.

7. The control method of the automatic driving vehicle according to claim 1, further comprising:
   after performing the automatic driving while maintaining the driving characteristics in the manual driving, performing the automatic driving based on automatic driving characteristics different from the manual driving characteristics.

8. The control method of the automatic driving vehicle according to claim 7, further comprising causing the driving characteristics to gradually transition from the manual driving characteristics to the automatic driving characteristics.

9. The control method of the automatic driving vehicle according to claim 7, wherein the automatic driving characteristics are modified such that an increase amount of uneasiness of the occupant in a certain time is less than or equal to a preset first threshold wherein the increase amount of the uneasiness of the occupant is based on a predetermined relationship between an occupant's comfort level and changing parameters of each automatic driving characteristic.

10. The control method of the automatic driving vehicle according to claim 1, further comprising:
    detecting uneasiness of the occupant in the automatic driving; and
    setting the manual characteristic maintaining time based on the uneasiness.

11. The control method of the automatic driving vehicle according to claim 7, further comprising:
    detecting vehicle speed; and
    performing transition from the manual driving characteristics to the automatic driving characteristics such that the lower the vehicle speed is, the longer the time taken for a speed increase is.

12. The control method of the automatic driving vehicle according to claim 7, further comprising:
    detecting a road width, and
    performing transition from the manual driving characteristics to the automatic driving characteristics such that the smaller the road width is, the longer the time taken for a speed increase is.

13. The control method of the automatic driving vehicle according to claim 7, further comprising:
    detecting an inter-vehicle distance; and
    performing transition from the manual driving characteristics to the automatic driving characteristics such that the shorter the inter-vehicle distance is, the longer the time taken to approach a preceding vehicle is.

14. The control method of the automatic driving vehicle according to claim 7, further comprising:
    detecting whether there is another vehicle in an adjacent lane; and
    performing transition from the manual driving characteristics to the automatic driving characteristics such that, when there is another vehicle in the adjacent lane, time taken to approach a preceding vehicle is longer.

15. The control method of the automatic driving vehicle according to claim 7, wherein the automatic driving characteristics are modified such that a decrease amount of uneasiness of the occupant in a certain time is more than or equal to a preset second threshold, wherein the decrease amount of the uneasiness of the occupant is based on a predetermined relationship between an occupant's comfort level and changing parameters of each automatic driving characteristic.

16. The control method of the automatic driving vehicle according to claim 7, further comprising:
    detecting vehicle speed; and
    performing transition from the manual driving characteristics to the automatic driving characteristics such that the higher the vehicle speed is, the shorter the time taken for a speed reduction is.

17. The control method of the automatic driving vehicle according to claim 7, further comprising:
    detecting a road width; and
    performing transition from the manual driving characteristics to the automatic driving characteristics such that the larger the road width is, the shorter the time taken for a speed reduction is.

18. The control method of the automatic driving vehicle according to claim 7, further comprising:
    detecting an inter-vehicle distance; and
    performing transition from the manual driving characteristics to the automatic driving characteristics such that the longer the inter-vehicle distance is, the shorter the time taken to move away from a preceding vehicle is.

19. The control method of the automatic driving vehicle according to claim 7, further comprising:
   detecting whether there is another vehicle in an adjacent lane; and
   performing transition from the manual driving characteristics to the automatic driving characteristics such that, when there is no vehicle in the adjacent lane, time taken to move away from a preceding vehicle is set shorter.

20. The control method of the automatic driving vehicle according to claim 7, further comprising:
   determining whether the vehicle has stopped in the switching from the manual driving to the automatic driving; and
   when determining that the vehicle has stopped, performing transition from the manual driving characteristics to the automatic driving characteristics.

21. A control device of an automatic driving vehicle switchable between manual driving in which the vehicle is made to travel depending on an operation of an occupant and automatic driving in which driving characteristics in automatic travel are set and the vehicle is made to automatically travel based on the driving characteristics, comprising: a configuration which performs the automatic driving while maintaining manual driving characteristics for a preset manual characteristic maintaining time when performing switching from the manual driving to the automatic driving, the manual driving characteristics being driving characteristics in the manual driving.

* * * * *